United States Patent
DeLine et al.

(10) Patent No.: US 9,539,956 B2
(45) Date of Patent: *Jan. 10, 2017

(54) ACCESSORY SYSTEM FOR A VEHICLE

(71) Applicant: MAGNA ELECTRONICS INC., Auburn Hills, MI (US)

(72) Inventors: Jonathan E. DeLine, Raleigh, NC (US); Niall R. Lynam, Holland, MI (US); Ralph A. Spooner, Holland, MI (US); Phillip A. March, Holland, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/971,197

(22) Filed: Dec. 16, 2015

(65) Prior Publication Data

US 2016/0096489 A1    Apr. 7, 2016

Related U.S. Application Data

(63) Continuation of application No. 14/021,475, filed on Sep. 9, 2013, now Pat. No. 9,283,900, which is a
(Continued)

(51) Int. Cl.
*B60R 11/04* (2006.01)
*H04N 5/374* (2011.01)
(Continued)

(52) U.S. Cl.
CPC ............ *B60R 11/04* (2013.01); *B60Q 3/023* (2013.01); *B60Q 3/0293* (2013.01); *B60R 1/04* (2013.01);
(Continued)

(58) Field of Classification Search
CPC .... B60R 11/02; B60R 1/12; B60R 2001/1253; B60R 11/04; B60R 1/04; B60R 2011/0033; B60R 2011/0077; B60R 2300/101; B60R 11/0217; B60R 11/0241; B60R 11/0247; B60R 2001/1284; B60R 2011/0026; B60Q 1/2665; B60Q 3/023; B60Q 3/0293; H04N 5/374; H04N 5/2253; H04N 7/183; B60S 1/0885; B60S 1/0881; G02B 2027/0118; G02B 2027/012; G02B 6/00; H04R 2499/13
See application file for complete search history.

(56) References Cited

U.S. PATENT DOCUMENTS 1,472,509 A    6/1922  Bitter
2,414,223 A    1/1947  De Virgilis
(Continued)

FOREIGN PATENT DOCUMENTS

CN    1235913    5/1999
DE    3515116    10/1986
(Continued)

OTHER PUBLICATIONS

"Combination of rain sensing, autolamps and telephone antenna in one module," Research Disclosure, Kenneth Mason Publications, Hampshire, GB No. 412, Aug. 1998 (Aug. 1998), p. 1045XP-000824825.
(Continued)

*Primary Examiner* — Mohamed Barakat
(74) *Attorney, Agent, or Firm* — Gardner, Linn, Burkhart & Flory, LLP

(57) ABSTRACT

An accessory system for a vehicle includes a bracket having a windshield-facing side and a cabin-facing side. The windshield-facing side of the bracket is configured to be bonded by an adhesive at a first windshield location to an in-cabin surface of the vehicle windshield. The cabin-facing side of the bracket includes first structure. An accessory module is configured to mount to the bracket. A housing of the
(Continued)

accessory module has second structure that directly engages the first structure of the bracket when mounting the housing to the bracket. An electronic device and circuitry are housed by the housing. With the accessory module mounted to the bracket attached to the vehicle windshield, the circuitry may be in communication with a vehicle bus system of the vehicle.

35 Claims, 5 Drawing Sheets

Related U.S. Application Data continuation of application No. 13/735,343, filed on Jan. 7, 2013, now Pat. No. 8,531,279, which is a continuation of application No. 13/209,648, filed on Aug. 15, 2011, now Pat. No. 8,350,683, which is a continuation of application No. 12/339,746, filed on Dec. 19, 2008, now Pat. No. 8,004,392, which is a continuation of application No. 11/374,347, filed on Mar. 13, 2006, now Pat. No. 7,468,652, which is a continuation of application No. 10/792,360, filed on Mar. 3, 2004, now Pat. No. 7,012,507, which is a continuation of application No. 10/270,830, filed on Oct. 15, 2002, now Pat. No. 6,717,524, which is a continuation of application No. 09/903,336, filed on Jul. 11, 2001, now Pat. No. 6,466,136, which is a continuation of application No. 09/396,179, filed on Sep. 14, 1999, now Pat. No. 6,278,377, which is a continuation-in-part of application No. 09/382,720, filed on Aug. 25, 1999, now Pat. No. 6,243,003.

(51) Int. Cl.
    *B60S 1/08*      (2006.01)
    *B60R 1/04*      (2006.01)
    *B60Q 3/02*      (2006.01)
    *B60R 11/02*     (2006.01)
    *H04N 5/225*     (2006.01)
    *H04N 7/18*      (2006.01)
    *B60Q 1/26*      (2006.01)
    *B60R 1/12*      (2006.01)
    *B60R 11/00*     (2006.01)
    *G02B 6/00*      (2006.01)
    *G02B 27/01*     (2006.01)

(52) U.S. Cl.
    CPC ............. *B60R 1/12* (2013.01); *B60R 11/02* (2013.01); *B60R 11/0217* (2013.01); *B60R 11/0247* (2013.01); *B60S 1/0881* (2013.01); *B60S 1/0885* (2013.01); *H04N 5/2253* (2013.01); *H04N 5/374* (2013.01); *H04N 7/183* (2013.01); *B60Q 1/2665* (2013.01); *B60R 11/0241* (2013.01); *B60R 2001/1253* (2013.01); *B60R 2001/1284* (2013.01); *B60R 2011/0026* (2013.01); *B60R 2011/0033* (2013.01); *B60R 2011/0077* (2013.01); *B60R 2300/101* (2013.01); *G02B 6/00* (2013.01); *G02B 2027/012* (2013.01); *G02B 2027/0118* (2013.01); *H04R 2499/13* (2013.01)

(56) References Cited

U.S. PATENT DOCUMENTS

| | | |
|---|---|---|
| 3,208,070 A | 9/1965 | Boicey |
| 3,367,616 A | 2/1968 | Bausch |
| 3,870,404 A | 3/1975 | Wilson et al. |
| 4,065,750 A | 12/1977 | Duncan et al. |
| 4,254,931 A | 3/1981 | Aikens et al. |
| 4,274,078 A | 6/1981 | Isobe et al. |
| 4,286,305 A | 8/1981 | Pilat et al. |
| 4,390,742 A | 6/1983 | Wideman |
| 4,443,057 A | 4/1984 | Bauer et al. |
| 4,645,975 A | 2/1987 | Meitzler et al. |
| 4,646,210 A | 2/1987 | Skogler et al. |
| 4,646,673 A | 3/1987 | Fordyce |
| 4,733,336 A | 3/1988 | Skogler et al. |
| 4,760,497 A | 7/1988 | Roston |
| 4,768,135 A | 8/1988 | Kretschmer et al. |
| 4,781,436 A | 11/1988 | Armbruster |
| 4,793,690 A | 12/1988 | Gahan et al. |
| 4,807,096 A | 2/1989 | Skogler et al. |
| 4,859,867 A | 8/1989 | Larson et al. |
| 4,863,130 A | 9/1989 | Marks, Jr. |
| 4,871,917 A | 10/1989 | O'Farrell et al. |
| 4,883,349 A | 11/1989 | Mittelhauser |
| 4,884,055 A | 11/1989 | Memmola |
| 4,886,960 A | 12/1989 | Molyneux et al. |
| 4,891,559 A | 1/1990 | Matsumoto et al. |
| 4,895,097 A | 1/1990 | Lechnir |
| 4,916,374 A | 4/1990 | Schierbeek et al. |
| 4,930,742 A | 6/1990 | Schofield et al. |
| 4,936,533 A | 6/1990 | Adams et al. |
| 4,948,242 A | 8/1990 | Desmond et al. |
| 4,956,591 A | 9/1990 | Schierbeek et al. |
| 4,967,319 A | 10/1990 | Seko |
| 4,973,844 A | 11/1990 | O'Farrell et al. |
| 5,058,851 A | 10/1991 | Lawlor et al. |
| 5,080,309 A | 1/1992 | Ivins |
| 5,096,287 A | 3/1992 | Kakinami et al. |
| 5,100,095 A | 3/1992 | Haan et al. |
| 5,111,289 A | 5/1992 | Lucas et al. |
| 5,140,455 A | 8/1992 | Varaprasad et al. |
| 5,151,816 A | 9/1992 | Varaprasad et al. |
| 5,160,780 A | 11/1992 | Ono et al. |
| 5,178,448 A | 1/1993 | Adams et al. |
| 5,193,029 A | 3/1993 | Schofield et al. |
| 5,255,442 A | 10/1993 | Schierbeek et al. |
| 5,264,997 A | 11/1993 | Hutchisson et al. |
| 5,266,873 A | 11/1993 | Arditi et al. |
| 5,327,288 A | 7/1994 | Wellington et al. |
| 5,330,149 A | 7/1994 | Haan et al. |
| D351,370 S | 10/1994 | Lawlor et al. |
| 5,361,190 A | 11/1994 | Roberts |
| 5,371,659 A | 12/1994 | Pastrick et al. |
| 5,377,948 A | 1/1995 | Suman et al. |
| 5,377,949 A | 1/1995 | Haan et al. |
| 5,406,414 A | 4/1995 | O'Farrell et al. |
| 5,426,294 A | 6/1995 | Kobayashi et al. |
| 5,439,305 A | 8/1995 | Santo |
| 5,448,180 A | 9/1995 | Kienzler et al. |
| 5,455,716 A | 10/1995 | Suman et al. |
| 5,469,298 A | 11/1995 | Suman et al. |
| 5,475,366 A | 12/1995 | Van Lente et al. |
| 5,487,522 A | 1/1996 | Hook |
| 5,488,352 A | 1/1996 | Jasper |
| 5,497,306 A | 3/1996 | Pastrick |
| 5,521,760 A | 5/1996 | De Young et al. |
| 5,530,240 A | 6/1996 | Larson et al. |
| 5,537,003 A | 7/1996 | Bechtel et al. |
| 5,550,677 A | 8/1996 | Schofield et al. |
| 5,558,123 A | 9/1996 | Castel et al. |
| 5,566,224 A | 10/1996 | Azam et al. |
| 5,567,896 A | 10/1996 | Gottschall |
| 5,570,127 A | 10/1996 | Schmidt |
| 5,572,354 A | 11/1996 | Desmond et al. |
| 5,576,687 A | 11/1996 | Blank et al. |
| 5,577,179 A | 11/1996 | Blank et al. |
| 5,582,383 A | 12/1996 | Mertens et al. |
| 5,587,236 A | 12/1996 | Agrawal et al. |
| 5,588,123 A | 12/1996 | Loibl |
| 5,602,457 A | 2/1997 | Anderson et al. |
| 5,609,652 A | 3/1997 | Yamada et al. |
| 5,614,885 A | 3/1997 | Van Lente et al. |
| 5,615,857 A | 4/1997 | Hook |
| 5,631,638 A | 5/1997 | Kaspar et al. |

(56) References Cited

U.S. PATENT DOCUMENTS

| | | |
|---|---|---|
| 5,632,551 A | 5/1997 | Roney et al. |
| 5,649,756 A | 7/1997 | Adams et al. |
| 5,654,686 A | 8/1997 | Geschke et al. |
| 5,659,423 A | 8/1997 | Schierbeek et al. |
| 5,660,454 A | 8/1997 | Mori et al. |
| 5,661,455 A | 8/1997 | Van Lente et al. |
| 5,666,157 A | 9/1997 | Aviv |
| 5,667,896 A | 9/1997 | Carter et al. |
| 5,669,698 A | 9/1997 | Veldman et al. |
| 5,669,705 A | 9/1997 | Pastrick et al. |
| 5,670,935 A | 9/1997 | Schofield et al. |
| 5,671,996 A | 9/1997 | Bos et al. |
| 5,689,241 A | 11/1997 | Clark, Sr. et al. |
| 5,691,848 A | 11/1997 | Van Lente et al. |
| D388,107 S | 12/1997 | Huckins |
| 5,703,568 A | 12/1997 | Hegyi |
| 5,708,410 A | 1/1998 | Blank et al. |
| 5,708,743 A | 1/1998 | DeAndrea et al. |
| 5,710,633 A | 1/1998 | Klappenbach et al. |
| 5,719,551 A | 2/1998 | Flick |
| 5,760,962 A | 6/1998 | Schofield et al. |
| 5,774,283 A | 6/1998 | Nagel et al. |
| 5,786,772 A | 7/1998 | Schofield et al. |
| 5,793,308 A | 8/1998 | Rosinski et al. |
| 5,796,094 A | 8/1998 | Schofield et al. |
| 5,796,176 A | 8/1998 | Kramer et al. |
| 5,798,575 A | 8/1998 | O'Farrell et al. |
| 5,798,688 A | 8/1998 | Schofield |
| 5,804,719 A | 9/1998 | Didelot et al. |
| 5,820,097 A | 10/1998 | Spooner |
| 5,820,245 A | 10/1998 | Desmond et al. |
| 5,825,283 A | 10/1998 | Camhi |
| 5,837,891 A | 11/1998 | Bridge |
| 5,837,994 A | 11/1998 | Stam et al. |
| 5,845,000 A | 12/1998 | Breed et al. |
| 5,863,116 A | 1/1999 | Pastrick et al. |
| 5,877,897 A | 3/1999 | Schofield et al. |
| 5,878,353 A | 3/1999 | ul Azam et al. |
| 5,883,193 A | 3/1999 | Karim |
| 5,910,854 A | 6/1999 | Varaprasad et al. |
| 5,920,061 A | 7/1999 | Feng |
| 5,923,027 A | 7/1999 | Stam et al. |
| 5,926,087 A | 7/1999 | Busch et al. |
| 5,938,321 A | 8/1999 | Bos et al. |
| 5,938,810 A | 8/1999 | De Vries, Jr. et al. |
| 5,940,503 A | 8/1999 | Palett et al. |
| 5,947,586 A | 9/1999 | Weber |
| 5,952,917 A | 9/1999 | Zimmermann et al. |
| 5,959,366 A | 9/1999 | Menke |
| 5,959,367 A | 9/1999 | O'Farrell et al. |
| 5,971,552 A | 10/1999 | O'Farrell et al. |
| 5,982,288 A | 11/1999 | Sawatari et al. |
| 5,990,469 A | 11/1999 | Bechtel et al. |
| 6,000,823 A | 12/1999 | Desmond et al. |
| 6,006,159 A | 12/1999 | Schmier et al. |
| 6,020,704 A | 2/2000 | Buschur |
| 6,028,537 A | 2/2000 | Suman et al. |
| 6,049,171 A | 4/2000 | Stam et al. |
| 6,056,410 A | 5/2000 | Hoekstra et al. |
| 6,066,933 A | 5/2000 | Ponziana |
| 6,087,942 A | 7/2000 | Sleichter, III et al. |
| 6,087,953 A | 7/2000 | DeLine et al. |
| 6,089,721 A | 7/2000 | Schierbeek |
| 6,097,023 A | 8/2000 | Schofield |
| 6,097,024 A | 8/2000 | Stam et al. |
| 6,100,798 A | 8/2000 | Liang |
| 6,108,084 A | 8/2000 | Winner |
| 6,124,647 A | 9/2000 | Marcus et al. |
| 6,124,886 A | 9/2000 | DeLine et al. |
| 6,151,065 A | 11/2000 | Steed et al. |
| 6,158,655 A | 12/2000 | DeVries, Jr. et al. |
| 6,166,625 A | 12/2000 | Teowee et al. |
| 6,166,698 A | 12/2000 | Turnbull et al. |
| 6,170,955 B1 | 1/2001 | Campbell et al. |
| 6,172,613 B1 * | 1/2001 | DeLine .......... B60K 35/00 248/549 |
| 6,176,602 B1 | 1/2001 | Pastrick et al. |
| 6,198,087 B1 | 3/2001 | Boon |
| 6,198,409 B1 | 3/2001 | Schofield et al. |
| 6,201,642 B1 | 3/2001 | Bos |
| 6,207,967 B1 | 3/2001 | Hochstein |
| 6,210,008 B1 | 4/2001 | Hoekstra et al. |
| 6,218,934 B1 | 4/2001 | Regan |
| 6,222,460 B1 | 4/2001 | DeLine et al. |
| 6,229,226 B1 | 5/2001 | Kramer et al. |
| 6,229,434 B1 | 5/2001 | Knapp et al. |
| 6,243,003 B1 | 6/2001 | DeLine et al. |
| 6,250,148 B1 | 6/2001 | Lynam |
| 6,259,359 B1 | 7/2001 | Fujinami et al. |
| 6,276,821 B1 | 8/2001 | Pastrick et al. |
| 6,278,377 B1 | 8/2001 | DeLine et al. |
| 6,291,905 B1 | 9/2001 | Drummond et al. |
| 6,294,989 B1 | 9/2001 | Schofield et al. |
| 6,296,379 B1 | 10/2001 | Pastrick |
| 6,299,316 B1 | 10/2001 | Fletcher et al. |
| 6,299,319 B1 | 10/2001 | Mertens et al. |
| 6,302,545 B1 | 10/2001 | Schofield et al. |
| 6,305,807 B1 | 10/2001 | Schierbeek |
| 6,313,454 B1 | 11/2001 | Bos et al. |
| 6,318,697 B1 | 11/2001 | Corrado et al. |
| 6,320,176 B1 | 11/2001 | Schofield et al. |
| 6,323,477 B1 | 11/2001 | Blasing et al. |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,013 B1 | 1/2002 | Battiti et al. |
| 6,341,523 B2 | 1/2002 | Lynam |
| 6,353,392 B1 | 3/2002 | Schofield et al. |
| 6,366,213 B2 | 4/2002 | DeLine et al. |
| 6,386,742 B1 | 5/2002 | DeLine et al. |
| 6,389,340 B1 | 5/2002 | Rayner |
| 6,392,218 B1 | 5/2002 | Kuehnle |
| 6,396,397 B1 | 5/2002 | Bos et al. |
| 6,406,152 B1 | 6/2002 | Hoekstra et al. |
| 6,412,973 B1 | 7/2002 | Bos et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,445,287 B1 | 9/2002 | Schofield et al. |
| 6,452,148 B1 | 9/2002 | Bendicks et al. |
| 6,466,136 B2 | 10/2002 | DeLine et al. |
| 6,477,464 B2 | 11/2002 | McCarthy et al. |
| 6,483,438 B2 | 11/2002 | DeLine et al. |
| 6,496,117 B2 | 12/2002 | Gutta et al. |
| 6,498,620 B2 | 12/2002 | Schofield et al. |
| 6,498,967 B1 | 12/2002 | Hopkins et al. |
| 6,501,387 B2 | 12/2002 | Skiver et al. |
| 6,509,832 B1 | 1/2003 | Bauer et al. |
| 6,513,252 B1 | 2/2003 | Schierbeek et al. |
| 6,515,378 B2 | 2/2003 | Drummond et al. |
| 6,516,664 B2 | 2/2003 | Lynam |
| 6,523,964 B2 | 2/2003 | Schofield et al. |
| 6,535,242 B1 | 3/2003 | Strumolo et al. |
| 6,545,598 B1 | 4/2003 | De Villeroche |
| 6,555,804 B1 | 4/2003 | Blasing |
| 6,564,122 B1 | 5/2003 | Huertgen et al. |
| 6,587,573 B1 | 7/2003 | Stam et al. |
| 6,587,968 B1 | 7/2003 | Leyva |
| 6,593,565 B2 | 7/2003 | Heslin et al. |
| 6,593,960 B1 | 7/2003 | Sugimoto et al. |
| 6,596,978 B2 | 7/2003 | Hochstein |
| 6,603,137 B2 | 8/2003 | Hochstein |
| 6,614,043 B2 | 9/2003 | Hochstein |
| 6,614,579 B2 | 9/2003 | Roberts et al. |
| 6,615,650 B2 | 9/2003 | Mahner et al. |
| 6,617,564 B2 | 9/2003 | Ockerse et al. |
| 6,646,359 B2 | 11/2003 | Schaefer et al. |
| 6,648,477 B2 | 11/2003 | Hutzel et al. |
| 6,653,615 B2 | 11/2003 | Bechtel et al. |
| 6,660,360 B2 | 12/2003 | Mertzel et al. |
| 6,672,744 B2 | 1/2004 | DeLine et al. |
| 6,672,745 B1 | 1/2004 | Bauer et al. |
| 6,681,163 B2 | 1/2004 | Stam et al. |

(56) References Cited

U.S. PATENT DOCUMENTS

| | | | |
|---|---|---|---|
| 6,690,268 B2 | 2/2004 | Schofield et al. | |
| 6,731,071 B2 | 5/2004 | Baarman | |
| 6,734,904 B1 | 5/2004 | Boon et al. | |
| 6,737,963 B2 | 5/2004 | Gutta et al. | |
| 6,738,088 B1 | 5/2004 | Uskolovsky et al. | |
| 6,742,904 B2 | 6/2004 | Bechtel et al. | |
| 6,742,905 B2 | 6/2004 | Suyama et al. | |
| 6,765,480 B2 | 7/2004 | Tseng | |
| 6,768,092 B2 | 7/2004 | Sakata | |
| 6,774,356 B2 | 8/2004 | Heslin et al. | |
| 6,774,810 B2 | 8/2004 | DeLine et al. | |
| 6,784,129 B2 | 8/2004 | Seto et al. | |
| 6,799,904 B2 | 10/2004 | Schaefer et al. | |
| 6,803,574 B2 | 10/2004 | Abel et al. | |
| 6,806,485 B2 | 10/2004 | Jackson, Jr. | |
| 6,811,330 B1 | 11/2004 | Tozawa | |
| 6,812,645 B2 | 11/2004 | Baarman | |
| 6,824,281 B2 | 11/2004 | Schofield et al. | |
| 6,825,620 B2 | 11/2004 | Kuennen et al. | |
| 6,831,268 B2 | 12/2004 | Bechtel et al. | |
| 6,831,288 B1 | 12/2004 | Schmitt et al. | |
| 6,832,719 B2 | 12/2004 | DeVries, Jr. et al. | |
| 6,841,767 B2 | 1/2005 | Mindl et al. | |
| 6,867,510 B2 | 3/2005 | Kramer et al. | |
| 6,877,870 B2 | 4/2005 | Krug | |
| 6,877,888 B2 | 4/2005 | DeLine et al. | |
| 6,889,064 B2 | 5/2005 | Baratono et al. | |
| 6,894,619 B1 | 5/2005 | Schmitt et al. | |
| 6,917,163 B2 | 7/2005 | Baarman | |
| 6,924,470 B2 | 8/2005 | Bechtel et al. | |
| 6,930,593 B2 | 8/2005 | Crawshaw | |
| 6,968,736 B2 | 11/2005 | Lynam | |
| 6,975,215 B2 | 12/2005 | Schofield et al. | |
| 6,975,390 B2 | 12/2005 | Mindl et al. | |
| 6,980,092 B2 | 12/2005 | Turnbull et al. | |
| 6,995,354 B2 | 2/2006 | Hagen et al. | |
| 7,004,593 B2 | 2/2006 | Weller et al. | |
| 7,016,783 B2 | 3/2006 | Hac et al. | |
| 7,027,387 B2 | 4/2006 | Reinold et al. | |
| 7,041,965 B2 | 5/2006 | Heslin et al. | |
| 7,053,761 B2 | 5/2006 | Schofield et al. | |
| 7,075,511 B1 | 7/2006 | Mousseau et al. | |
| 7,108,409 B2 | 9/2006 | DeLine et al. | |
| 7,111,996 B2 | 9/2006 | Seger et al. | |
| 7,120,261 B1* | 10/2006 | Turnbull | B60R 11/0247 381/355 |
| 7,188,963 B2 | 3/2007 | Schofield et al. | |
| 7,195,381 B2 | 3/2007 | Lynam et al. | |
| 7,199,767 B2 | 4/2007 | Spero | |
| 7,205,524 B2 | 4/2007 | Drummond et al. | |
| 7,242,320 B2 | 7/2007 | Lawlor et al. | |
| 7,249,860 B2 | 7/2007 | Kulas et al. | |
| 7,255,451 B2 | 8/2007 | McCabe et al. | |
| 7,255,465 B2 | 8/2007 | DeLine et al. | |
| 7,262,406 B2 | 8/2007 | Heslin et al. | |
| 7,265,342 B2 | 9/2007 | Heslin et al. | |
| 7,289,037 B2 | 10/2007 | Uken et al. | |
| 7,297,932 B2 | 11/2007 | Georgiadis et al. | |
| 7,304,680 B2 | 12/2007 | Köhler et al. | |
| 7,311,428 B2 | 12/2007 | DeLine et al. | |
| 7,322,755 B2 | 1/2008 | Neumann et al. | |
| 7,370,983 B2 | 5/2008 | DeWind et al. | |
| 7,420,159 B2 | 9/2008 | Heslin et al. | |
| 7,438,774 B2 | 10/2008 | Kurfiss et al. | |
| 7,446,427 B2 | 11/2008 | Parker et al. | |
| 7,460,007 B2 | 12/2008 | Schofield et al. | |
| 7,467,883 B2 | 12/2008 | DeLine et al. | |
| 7,480,149 B2 | 1/2009 | DeWard et al. | |
| 7,490,944 B2 | 2/2009 | Blank et al. | |
| 7,497,632 B2 | 3/2009 | Kajino et al. | |
| 7,533,998 B2 | 5/2009 | Schofield et al. | |
| 7,538,316 B2 | 5/2009 | Heslin et al. | |
| 7,570,793 B2 | 8/2009 | Lages et al. | |
| 7,609,961 B2 | 10/2009 | Park | |
| 7,646,889 B2 | 1/2010 | Tsukamoto | |
| 7,651,228 B2 | 1/2010 | Skiver et al. | |
| 7,657,052 B2 | 2/2010 | Larson et al. | |
| 7,658,521 B2 | 2/2010 | DeLine et al. | |
| 7,697,028 B1 | 4/2010 | Johnson | |
| 7,719,408 B2 | 5/2010 | DeWard et al. | |
| 7,728,721 B2 | 6/2010 | Schofield et al. | |
| 7,780,137 B2 | 8/2010 | Hansel et al. | |
| 7,780,454 B2 | 8/2010 | Baranski | |
| 7,811,011 B2 | 10/2010 | Blaesing et al. | |
| 7,817,205 B2 | 10/2010 | Schulte et al. | |
| 7,837,173 B2 | 11/2010 | Zinser et al. | |
| 7,855,353 B2 | 12/2010 | Blaesing et al. | |
| 7,855,755 B2 | 12/2010 | Weller et al. | |
| 7,860,275 B2 | 12/2010 | Leleve et al. | |
| 7,864,981 B2 | 1/2011 | Leleve et al. | |
| 7,888,629 B2 | 2/2011 | Heslin et al. | |
| 7,889,086 B2 | 2/2011 | Schafer et al. | |
| 7,911,356 B2 | 3/2011 | Wohlfahrt et al. | |
| 7,914,188 B2 | 3/2011 | DeLine et al. | |
| 7,916,009 B2 | 3/2011 | Schofield et al. | |
| 7,940,305 B2 | 5/2011 | Adameck | |
| 7,965,336 B2 | 6/2011 | Bingle et al. | |
| 7,994,471 B2 | 8/2011 | Heslin et al. | |
| 8,051,707 B2 | 11/2011 | Roehr et al. | |
| 8,081,772 B2* | 12/2011 | Turnbull | H04R 3/005 381/312 |
| 8,094,002 B2 | 1/2012 | Schofield et al. | |
| 8,100,568 B2 | 1/2012 | DeLine et al. | |
| 8,134,117 B2 | 3/2012 | Heslin et al. | |
| 8,179,437 B2 | 5/2012 | Schofield et al. | |
| 8,192,095 B2 | 6/2012 | Kortan et al. | |
| 8,256,821 B2* | 9/2012 | Lawlor | B60R 1/12 296/37.8 |
| 8,288,711 B2 | 10/2012 | Heslin et al. | |
| 8,309,907 B2 | 11/2012 | Heslin et al. | |
| 8,325,028 B2 | 12/2012 | Schofield et al. | |
| 8,339,453 B2 | 12/2012 | Blake, III et al. | |
| 8,405,726 B2 | 3/2013 | Schofield et al. | |
| 8,481,916 B2 | 7/2013 | Heslin et al. | |
| 8,508,593 B1 | 8/2013 | Schofield et al. | |
| 8,513,590 B2 | 8/2013 | Heslin et al. | |
| 8,531,278 B2 | 9/2013 | DeWard et al. | |
| 8,531,279 B2 | 9/2013 | DeLine et al. | |
| 8,534,887 B2 | 9/2013 | DeLine et al. | |
| 8,686,840 B2 | 4/2014 | Drummond et al. | |
| 8,692,659 B2 | 4/2014 | Schofield et al. | |
| 8,710,969 B2* | 4/2014 | Deward | B60R 11/04 340/425.5 |
| 8,749,367 B2 | 6/2014 | Schofield et al. | |
| 9,035,233 B2 | 5/2015 | Lynam et al. | |
| 2002/0003571 A1 | 1/2002 | Schofield et al. | |
| 2002/0075387 A1 | 6/2002 | Janssen | |
| 2002/0126457 A1 | 9/2002 | Kameyama | |
| 2003/0070741 A1 | 4/2003 | Rosenberg et al. | |
| 2004/0200948 A1 | 10/2004 | Bos et al. | |
| 2004/0246607 A1* | 12/2004 | Watson | B60R 1/12 359/872 |
| 2005/0237385 A1 | 10/2005 | Kosaka et al. | |
| 2006/0050018 A1 | 3/2006 | Hutzel et al. | |
| 2006/0061008 A1 | 3/2006 | Karner et al. | |
| 2006/0109996 A1* | 5/2006 | Larson | H04N 7/18 381/365 |
| 2007/0132610 A1 | 6/2007 | Guernalec et al. | |
| 2007/0235638 A1 | 10/2007 | Backes et al. | |
| 2008/0092673 A1 | 4/2008 | Hansel et al. | |
| 2009/0097674 A1* | 4/2009 | Watson | B60R 1/12 381/86 |
| 2010/0085653 A1* | 4/2010 | Uken | B60R 1/04 359/872 |
| 2010/0208077 A1 | 8/2010 | DeWard et al. | |
| 2011/0025850 A1 | 2/2011 | Maekawa et al. | |
| 2011/0155874 A1 | 6/2011 | Roehr et al. | |
| 2012/0224065 A1 | 9/2012 | Schofield et al. | |
| 2012/0310519 A1 | 12/2012 | Lawlor et al. | |
| 2014/0015976 A1 | 1/2014 | DeLine et al. | |

(56) References Cited

U.S. PATENT DOCUMENTS

FOREIGN PATENT DOCUMENTS

| | | |
|---|---|---|
| DE | 3525672 | 1/1987 |
| DE | 3605704 | 8/1987 |
| DE | 3937576 | 11/1989 |
| DE | 9306989.8 | 7/1993 |
| DE | 4214223 | 11/1993 |
| DE | 4329983 | 3/1995 |
| DE | 29513369 | 12/1995 |
| DE | 29703084 | 4/1997 |
| DE | 19647200 | 1/1998 |
| DE | 29805142 | 6/1998 |
| DE | 19755008 | 7/1999 |
| DE | 10132982 | 1/2003 |
| DE | 10211444 | 10/2003 |
| DE | 10237554 | 3/2004 |
| DE | 10237607 | 3/2004 |
| DE | 10342837 | 4/2005 |
| DE | 102005002686 | 8/2006 |
| DE | 102005015973 | 10/2006 |
| DE | 102006039065 | 3/2007 |
| DE | 19530617 | 2/2009 |
| EP | 0169734 | 10/1989 |
| EP | 0461424 | 12/1991 |
| EP | 0602962 | 6/1994 |
| EP | 0667254 | 8/1995 |
| EP | 0756968 | 2/1997 |
| EP | 0874331 | 3/1998 |
| EP | 0677428 | 6/1998 |
| EP | 0899157 | 3/1999 |
| EP | 0928723 | 7/1999 |
| EP | 0969275 | 1/2000 |
| EP | 1058220 | 12/2000 |
| EP | 0860325 | 11/2002 |
| EP | 1376051 | 1/2004 |
| EP | 1389565 | 2/2004 |
| GB | 1008411 | 10/1965 |
| GB | 1178416 | 1/1970 |
| GB | 1197710 | 7/1970 |
| GB | 2210835 | 6/1989 |
| GB | 2316379 | 2/1998 |
| IE | 970014 | 7/1998 |
| JP | 59029539 | 2/1984 |
| JP | 62043543 | 2/1987 |
| JP | S62131837 | 6/1987 |
| JP | 63258236 | 10/1988 |
| JP | 63258237 | 10/1988 |
| JP | 06113215 | 4/1994 |
| JP | 11069211 | 3/1999 |
| JP | H1178717 | 3/1999 |
| JP | H1178737 | 3/1999 |
| JP | 11131880 | 5/1999 |
| JP | 11254925 | 9/1999 |
| WO | WO 9523082 | 8/1995 |
| WO | WO 9618275 | 6/1996 |
| WO | WO 9701246 | 1/1997 |
| WO | WO 9748134 | 12/1997 |
| WO | WO 9814974 | 4/1998 |
| WO | WO 9914088 | 3/1999 |
| WO | WO 9923828 | 5/1999 |
| WO | WO 9943242 | 9/1999 |
| WO | WO 0015462 | 3/2000 |
| WO | WO 0164481 | 9/2001 |
| WO | WO 0177763 | 10/2001 |
| WO | WO 0126332 | 12/2001 |
| WO | WO 02071487 | 9/2002 |
| WO | WO 03065084 | 8/2003 |

OTHER PUBLICATIONS

"Bus". 696-1983 IEEE Standard 696 Interface Devices, http://ieeexplore.ieee.org/xpl/abstractStandardDictionary.jsp?&arnumber=579126, accessed Aug. 7, 2014.

Batavia, et al., "Overtaking vehicle detection using implicit optical flow", Proceedings of the IEEE Transportation Systems Conference, Nov. 1997, pp. 729-734.

Batavia, et al., "Driver-Adaptive Lane Departure Warning Systems", the Robotics Institute, Carnegie Mellon University, Pittsburgh, PA, 1999.

CAN Specification, Version 2.0, Bosch, 1991.

Cardiles, N. "Implementation de la commande d'un vehicule electrique autonome grace a un capteur de distance et d'angle base sur une camera lineaire" IUP de Mathematiques Appliquees et Industrielles, May 8, 1998.

Dally & Poulton, Digital Systems Engineering, Cambridge University Press, 1998.

Devlin, William A., The Eyellipse and Considerations in the Driver's Forward Field of View, SAE 680105, Society of Automotive Engineers, Inc., Automotive Engineering Congress, Detroit, Michigan, (Jan. 8-12, 1968).

Ernst, S., et al. "Camera calibration for lane and obstacle detection" Intelligent Transportation Systems, 1999. Proc., Oct. 5-8, 1999 pp. 356-361.

Gehrig, S.; "Design, simulation, and implementation of a vision-based vehicle-following system" Doctoral Dissertation., Jul. 31, 2000.

Goldbeck, J. et al., *Lane detection and tracking by video sensors*, Intelligent Transportation Systems, 1999. Proc., Oct. 5-8, 1999, pp. 74-49.

Jochem et al.; "PANS: a portable navigation platform", The Robotics Institute, Carnegie Mellon University, Pittsburgh, PA, no date.

Jochem, Todd et al., Life in the Fast Lane, AI Magazine, vol. 17, No. 2, pp. 11-50, Summer 1996.

Lisowski, L., "*Specifications of a small electric vehicle: modular and distributed approach*", Intelligent Robots and Systems, 1997, IROS '97, Proceedings of the 1997 IEEE/RSJ International Conference on, vol. 2, Sep. 7-11, 1997.

Maurer, et al., "VaMoRs-P: an advanced platform for visual autonomous road vehicle guidance", 1995.

MC68331 User's Manual, Freescale Semiconductor, Inc., 1994.

Media highlight reel for the National Automated Highway System Consortium's Demo '97, found at https://www.youtube.com/watch?v=6sDmA-sK3aE&list=PL80069F102808FBA3&index=6.

Motorola, Inc., MVME162 Embedded Controller Installation Guide (MVME162IG/D2), Aug. 1994.

N.R. Lynam and A. Agrawal, "Automotive Applications of Chromogenic Materials," from *Large Area Chromogenics: Materials and Devices for Transmittance Control*, C.M. Lampert and C.G. Granquist, EDS, Optical Engineering Press, Washington (1990).

N.R. Lynam, "Electrochromic Automotive Day/Night Mirror," SAE Technical Paper Series, 870636 (1987).

N. R. Lynam, "Smart Windows for Automobiles," *SAE Technical Paper Series*, 900419 (1990).

Navlab on Scientific American Frontiers http://youtu.be/507-gmGsq1o.

No Hands Across America Journal, web page at http://www.cs.cmu.ed/~tjochem/nhaa/Journal.html.

No Hands Across American Official Press Release web page at http://www.cs.cmu.edu/~tjochem/nhaa/official_press_release.html.

Parent et al., Automatic Driving for Small Public Urban Vehicles, Intelligent Vehicle Symposium, Tokyo, Jul. 14-16, 1993.

Parker, McGraw-Hill Dictionary of Scientific and Technical Terms, Fifth Ed., 1994.

Pelco Fixed Focal Length Lenses Product Specification.

Philips Components, PCA82C200 Stand-alone CAN-controller, Oct. 1990.

Photographs evidencing a Watec WAT-660D camera, the model of camera which was used as the forward facing camera on Navlab 6 and photographs evidencing the mounting bracket used for attaching the WatecWAT-660D camera to the windshield of the Navlab 6.

Pomerleau, "Alvinn: An Autonomous Land Vehicle in a Neural Network", Technical Report AIP-77 Department of Psychology, Carnegie Mellon University, Mar. 13, 1990.

Pomerleau, et al., "Rapidly Adapting Machine Vision for Automated Vehicle Steering", Apr. 30, 1996, pp. 19-27.

(56) References Cited

OTHER PUBLICATIONS

Radatz, The IEEE Standard Dictionary of Electrical Terms, 6$^{th}$ ed., IEEE Std. 100-1996, p. 287.
Rayner et al., "I-Witness Black Box Recorder", Intelligent Transportation Systems Program, Final Report for ITS-IDEA Project 84, published Nov. 2001.
Run-Off-Road Project Final Video http://youtu.be/nzxfMzVmnhM.
SAE Technical Paper 2001-01-0072-LIN.
Sony Operating Manual CCD Color Video Camera Model: DXC-151A, 1993.
Sony Specifications Single Chip CCD Color Video Camera DXC-151A.
Thorpe, et al., "The 1997 Automated Highway Free Agent Demonstration", 1997 pp. 496-501.6049.
Thorpe, et al, "Toward autonomous driving: the CMU Navlab. I. Perception", IEEE Paper 1991.
Web page at http://www.glassrack.net/potrsp1919192.html?utm_source=googlepepla&utm_medium=adwords&id=116297830341.
Webpage: http://parts.royaloakschevy.com/showAssembly.aspx?makeName=pontiac&modelYear=1990&modelName=trans-sport&ukey_assembly=5888560&ukey_category=53643&assembly=921201mu10-009mu10-009.
IPR Proceeding No. IPR2014-01499, filed Sep. 12, 2014, re U.S. Pat. No. 8,531,279.

\* cited by examiner

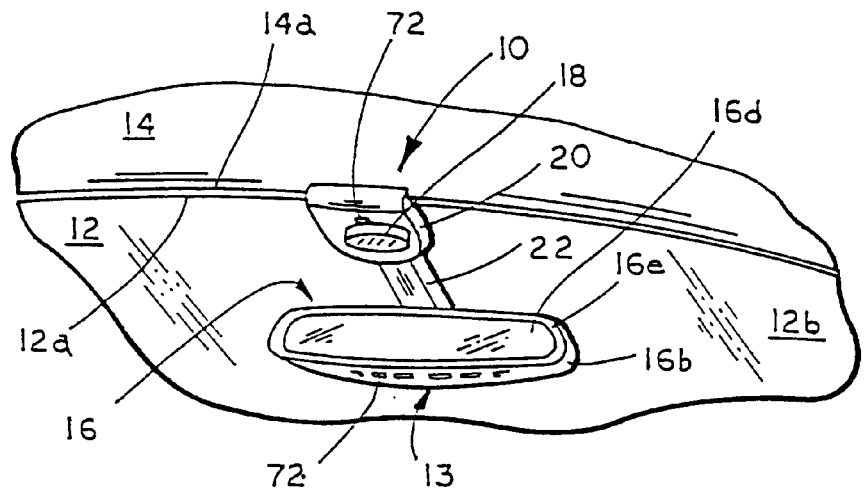
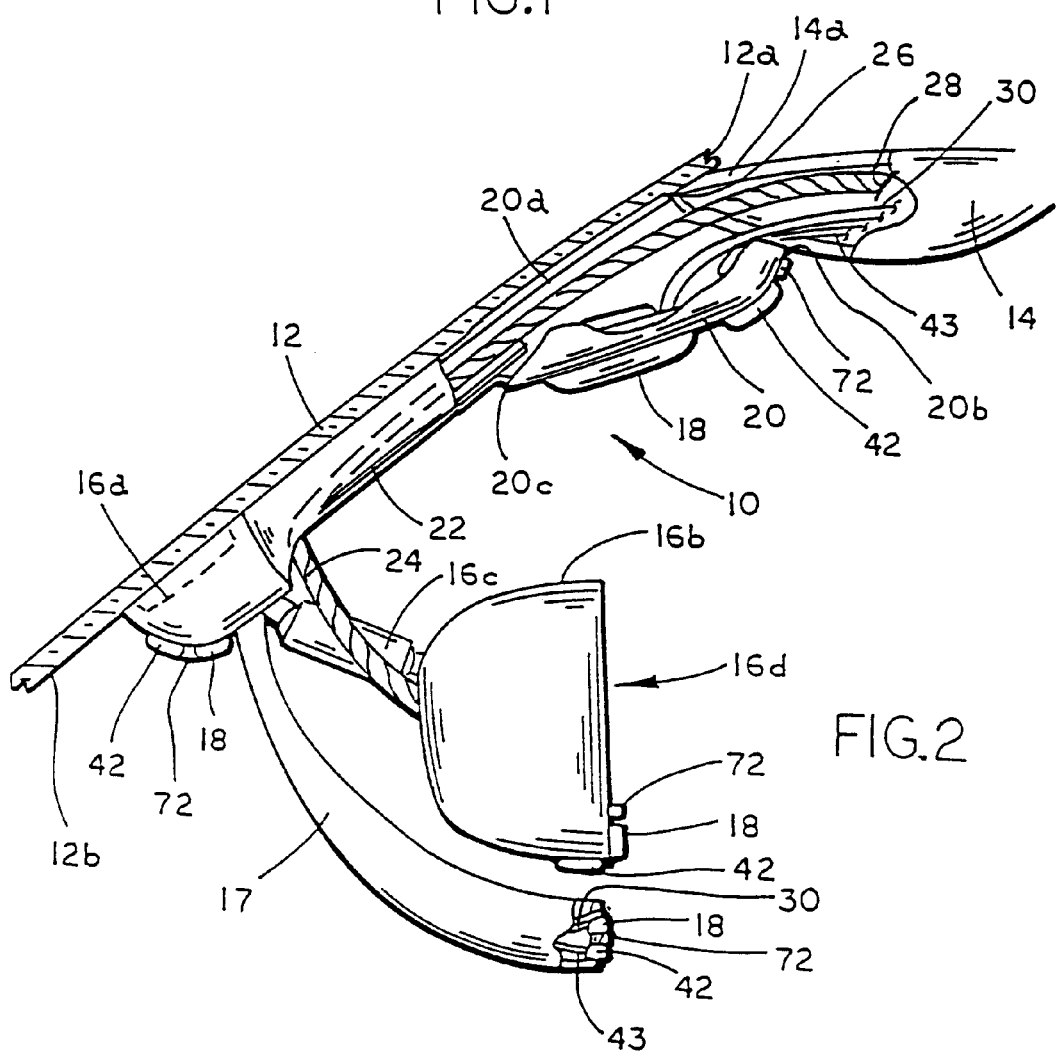

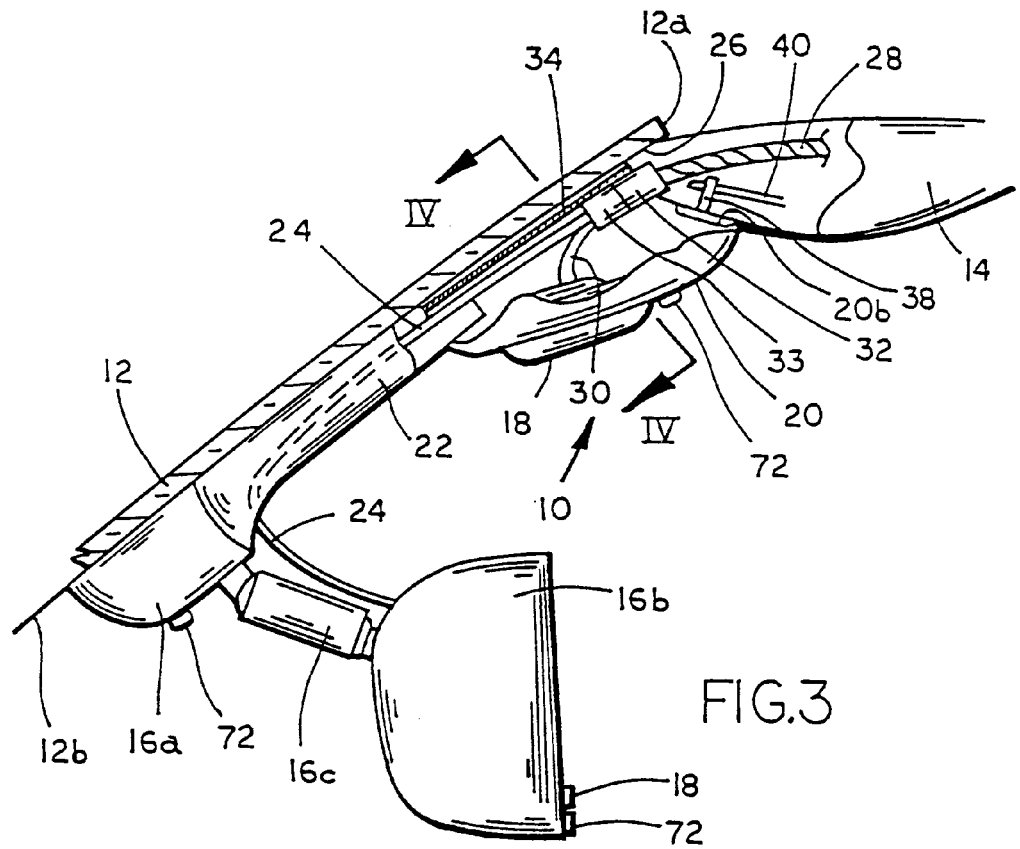
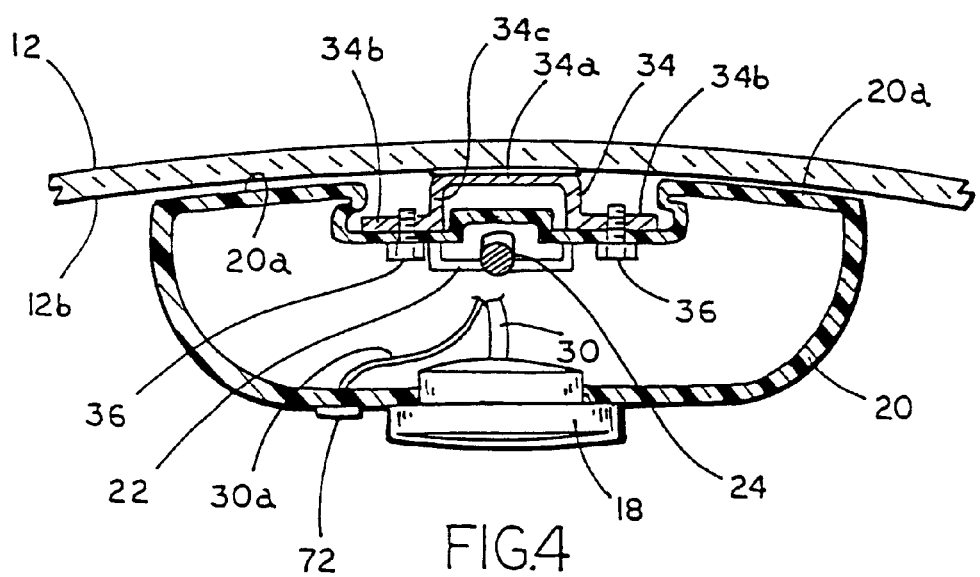

ACCESSORY SYSTEM FOR A VEHICLE

CROSS-REFERENCE TO RELATED APPLICATIONS

The present application is a continuation of U.S. patent application Ser. No. 14/021,475, filed Sep. 9, 2013, which is a continuation of U.S. patent application Ser. No. 13/735,343, filed Jan. 7, 2013, now U.S. Pat. No. 8,531,279, which is a continuation of U.S. patent application Ser. No. 13/209,648, filed Aug. 15, 2011, now U.S. Pat. No. 8,350,683, which is a continuation of U.S. patent application Ser. No. 12/339,746, filed Dec. 19, 2008, now U.S. Pat. No. 8,004,392, which is a continuation of U.S. patent application Ser. No. 11/374,347, filed Mar. 13, 2006, now U.S. Pat. No. 7,468,652, which is a continuation of U.S. patent application Ser. No. 10/792,360, filed Mar. 3, 2004, now U.S. Pat. No. 7,012,507, which is a continuation of U.S. patent application Ser. No. 10/270,830, filed Oct. 15, 2002, now U.S. Pat. No. 6,717,524, which is a continuation of U.S. patent application Ser. No. 09/903,336, filed Jul. 11, 2001, now U.S. Pat. No. 6,466,136, which is a continuation of U.S. patent application Ser. No. 09/396,179, filed Sep. 14, 1999, now U.S. Pat. No. 6,278,377, which is a continuation-in-part of U.S. patent application Ser. No. 09/382,720, filed Aug. 25, 1999, now U.S. Pat. No. 6,243,003, which are hereby incorporated herein by reference in their entireties.

BACKGROUND OF THE INVENTION

The present invention relates generally to an indicator for a vehicle accessory and, more particularly, to an indicator for a microphone for use in receiving an audio signal within a vehicle.

Many vehicles today use hands-free cellular telephones or other communication devices to avoid problems which may arise when a driver of a vehicle has to hold a telephone while driving the vehicle. These hand-free devices include a microphone to receive an audio signal from within the vehicle. It is known to include directional or polar microphones in these devices, which constrain the area covered by the microphone to an area where voices would typically originate, such as a driver's head area. In certain applications, these microphones are implemented in an interior rearview mirror, such that the microphone is positioned in front of the driver and at approximately the same level as the head of the driver. However, the location of the mirror may be at a distance which is beyond the optimal operative range of the microphone, due to the forward slant of the windshield away from the driver and the location at which the mirror is mounted thereto. Furthermore, rearview mirrors are adjustable to account for different sized drivers, which may result in the microphone being directed away from the head of the driver or other occupants, and thus receiving other noises from within the cabin of the vehicle.

An additional issue with known mirror-mounted microphones (such as interior rearview mirror assemblies with a microphone located within the movable mirror housing and/or the mirror mounting bracket, such as a header mounting bracket) is that typically, audio or communication devices in vehicles are optional. Accordingly, separate mirror housings and wiring bundles or harnesses are required to accommodate the standard mirror and the optional mirror which includes the microphone or other accessories such as a vehicle alarm status indicator. This leads to a proliferation of parts within the vehicle assembly plants, which further results in increased costs to the vehicle.

Many vehicles which offer hands-free communication devices mount the microphones in a headliner console rearward of the windshield and along the ceiling of the interior cabin of the vehicle. By mounting the microphones in the headliner console, the microphones may be in a substantially fixed position and directed toward the driver head area within the vehicle. However, this positions the microphone substantially above the driver where it may not optimally pick up the voice signal of the driver, since the driver's voice is directed generally forwardly while the driver continues to view the roadway, while the microphone is directed generally downwardly from the ceiling. Furthermore, locating the microphones in a headliner console adds to the vehicle costs, due to additional installation processes and more costly parts, such as additional ceiling trim, console components and the like. Also, locating the microphone in a headliner console fails to avoid the requirement of at least two separate headliner consoles to accommodate the optional microphone verses a console without the microphone.

An additional issue with communication devices in vehicles is that when the device is in use, the user may not be certain that the message conveyed is properly received by the other party. This may be especially troublesome when the other party is an automated voice system which responds to a particular voice communication.

Therefore, there is a need in the art for a microphone which may be mounted generally forwardly of the driver of the vehicle, and fixedly mounted to maintain proper orientation with respect to the driver of the vehicle.

SUMMARY OF THE INVENTION

The present invention is intended to provide an indicator for a microphone or accessory module, and preferably for an indicator for a microphone mounted in, at or on an interior rearview mirror assembly to comprise part of an interior rearview mirror system. The microphone or accessory module preferably mounts along an upper, inner edge of the windshield of a vehicle to direct the microphone, which is preferably a polar or directional microphone, generally downwardly and rearwardly toward the driver of the vehicle, and most preferably, towards the head of the driver, in order to best pick up vocal communication from the driver's mouth. The indicator provides an indication signal, preferably a visual indication signal, to the user of the microphone which indicates whether the voice communication from the user is adequately being received and preferably whether the communication is adequately being discriminated from other audible inputs received by the microphone that are non-vocal. Thus, the indicator provides an indication signal that an adequately high vocal signal to audible non-vocal noise discrimination ratio is occurring. The accessory module is adaptable for use on a vehicle with a rearview mirror which is separately mounted on the interior surface of the windshield such as a button mounted rearview mirror, and may further include a wire cover extending downwardly from the module to the mounting button of the rearview mirror. The wire cover functions to cover any mirror wiring harness which may connect the rearview mirror assembly to a vehicle wiring harness, typically within the headliner of the vehicle.

According to an aspect of the present invention, an audio system for a vehicle comprises a microphone and an indicator. The vehicle has a cabin and a windshield. The microphone is operable to receive audio signals from within the cabin. The audio signals include vocal signals generated by the human voices of vehicle occupants. The indicator is operable to communicate a receiving status of the audio signals to a user of the audio system and is adapted to indicate to the driver and/or other occupants of the vehicle that a voice generated vocal signal is being appropriately received by the audio system that the microphone feeds, and that the vocal signal is being appropriately and substantially discriminated compared to other audible non-vocal signals picked up by the microphone, such as HVAC noise, wind noise, music and the like. The indicator may communicate a receiving status of the microphone and/or a receiving status of another party remote from the vehicle. Thus, the indicator operates to confirm to the driver that verbal inputs/commands/messages/sentences, as spoken by the driver have been received at the microphone and processed by the audio system with sufficient clarity and volume, such that the verbal inputs/commands/messages/sentences have been adequately correctly received. This is of particular importance when the driver and/or occupants of the vehicle are communicating via the microphone/audio system in the vehicle via radio transmission to a receiver remote from the vehicle. Such remote receivers can provide a variety of services that are selected by and/or are dependent on clear and audible voice input received from the vehicular audio system. For example, a concierge-type service can be provided, whereby a restaurant, address, etc., listing can be provided. Also, the vehicle occupant may be voice communicating with an automatic computer based service, such as airline reservation services and the like, where the driver must select menu items through verbal input of an alpha-numeric (typically a number) input. Lack of clarity and/or volume and/or the presence of noise may lead to an incorrect selection at the remote receiving party, unbeknownst to the vehicle based driver and/or occupant. The indicator of the present invention thus provides to the driver and/or occupants of the vehicle an indication that verbal input to the audio system in the vehicle is being adequately correctly received by the audio system in the vehicle and/or, more preferably, is being adequately received after transmission to the remote receiver. Thus, by having an adequately clear reception by the remote receiver external to the vehicle confirmed back to the vehicular audio system, and by having this indicated to the driver and/or other occupants by the indicator of the present invention, protection is provided against inadequate communication, even caused by interference during the transmission from the vehicle to the remote receiver or receiving party.

According to another aspect of the present invention, an accessory module comprises at least one microphone for receiving audio signals from within a cabin of a vehicle, at least one indicator, and a housing for mounting the microphone. The vehicle includes a windshield, an interior rearview mirror mounted to an interior surface of the windshield, and a headliner extending along an upper edge of the windshield. The indicator is operable to communicate a receiving status of the audio signals to a user of the audio system. The housing for the microphone is preferably mountable between the headliner and the rearview mirror. The microphone and indicator of the accessory module (and any other accessory housed within the accessory module) are electronically connectable to a vehicle wiring within the headliner. Preferably, accessories, such as the microphone and the indicator, are detachably connectable to the vehicle wiring, such as by a plug and socket connector (for example, a multi-pin electrical plug and socket connector system), so that the module can be optionally installed to the vehicle with ease. This is particularly advantageous in circumstances when the interior mirror is a non-electrical mirror, such as a base prismatic mirror.

In one form, the rearview mirror is electronically connected to the vehicle wiring harness. Preferably, the accessory module further includes a wire cover to encase a wire harness between the rearview mirror and the accessory module. More preferably, the microphone, indicator and mirror are connectable with the vehicle wiring in the headliner.

According to another aspect of the present invention, an accessory module for a vehicle comprises at least one microphone for receiving audio signals from within a cabin of the vehicle, a microphone housing for mounting the microphone, and an interior rearview mirror assembly. The vehicle includes a windshield and a headliner extending along an upper, inner edge of the windshield. The microphone is electronically connectable to a vehicle wiring harness within the headliner. The microphone housing is mountable to the windshield adjacent to the headliner. The mirror assembly includes a mirror wire harness and a mirror housing. The mirror wire harness is electronically connectable to the vehicle wiring harness in the headliner. An indicator may be provided for the audio system to communicate an audio signal receiving status to a user of the audio system.

In one form, the mirror assembly further includes a mounting button for mounting the mirror assembly to an interior surface of the windshield. The mounting button may be interconnected to the microphone housing via a wire cover extending between the microphone housing and the mounting button and at least partially encasing the mirror wire harness and/or the mounting button itself. The indicator may be mounted on at least one of the accessory module, the mirror housing, a module/pod attached to the mounting button, and the mounting button.

In another form, the microphone housing includes a mirror mounting arm which extends generally downwardly therefrom. The mirror housing is pivotally interconnected to a lower end of the mounting arm. The mirror wire harness is at least partially encased within the mounting arm.

Accordingly, the present invention provides an indicator for a microphone or accessory module for use with an audio system, such as a hands-free cellular telephone, audio recording device, emergency communication device or the like. The indicator provides a signal to a user of the audio system which communicates whether a human vocal audio signal being received by the audio system is above a threshold level and/or is at least substantially discriminated from other audible noise, so that the vocal signal to non-vocal audible signals received by the audio system from the microphone exceeds a predetermined threshold ratio. Preferably, this ratio is at least 2:1. Most preferably, this ratio is at least 10:1. The microphone and indicator may be mounted in the vehicle cabin, and preferably is mounted as part of the interior rearview mirror system. The accessory module may contain the microphone and/or the indicator and is preferably mounted above the mirror between the mirror and the headliner of the vehicle, which provides a fixed location of the microphone for maintaining proper orientation of the microphone with respect to the vehicle interior. The indicator may be mounted at the accessory module, a rearview mirror housing, behind the mirror reflector in the housing so as to illuminate through the reflector, a rearview mirror mounting portion or a headliner of the vehicle. Because the accessory module is a separate component from the mirror and headliner, additional mirror or headliner console components for mounting the microphone are not required. The present invention facilitates fewer parts in the assembly plant since the headliner and mirror assembly may be the same part regardless of whether the audio or communication device associated with the invention is to be installed within the vehicle. Furthermore, because the accessory module does not require special headliners or mirrors, the accessory module may be easily installed as an aftermarket device.

These and other objects, advantages, purposes and features of this invention will become apparent upon review of the following specification in conjunction with the drawings.

BRIEF DESCRIPTION OF THE DRAWINGS

FIG. 1 is a perspective view of the microphone module of the present invention;

FIG. 2 is a side elevation shown partially in section of the microphone module in FIG. 1;

FIG. 3 is a similar side elevation as that in FIG. 2, showing an alternate electrical connection and mounting bracket for the microphone module;

FIG. 4 is a sectional plan view of the microphone module taken along the line IV-IV in FIG. 3;

DESCRIPTION OF THE PREFERRED EMBODIMENTS

Figure 5:
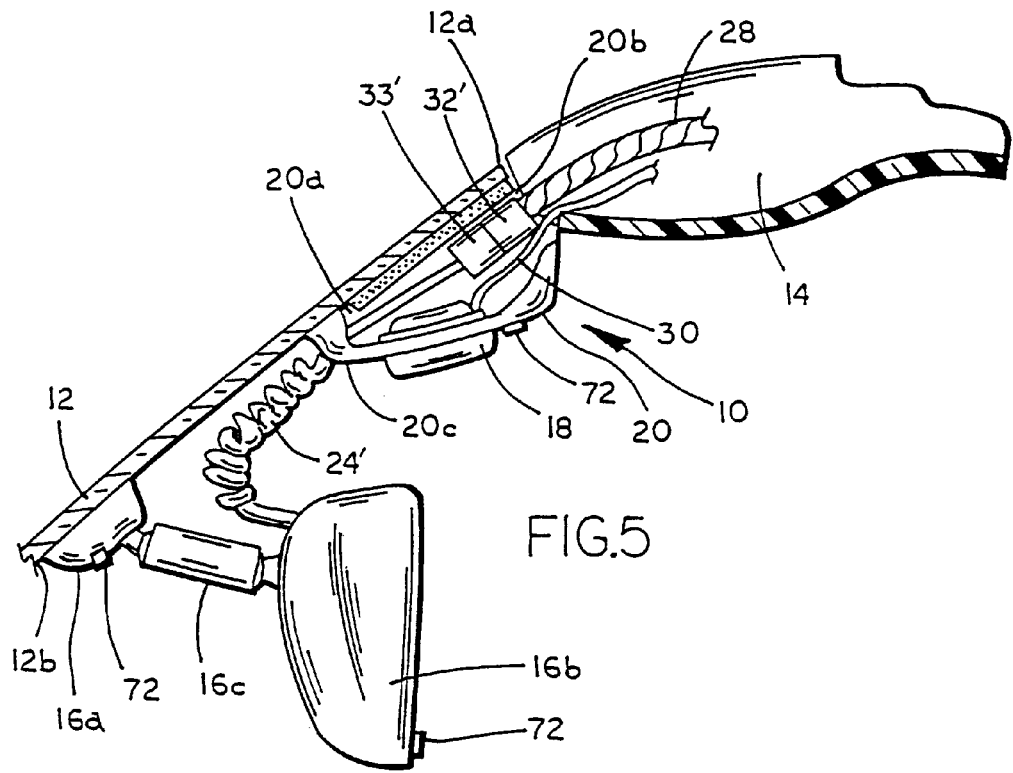
FIG. 5 is a similar side elevation as that in FIG. 2, showing a microphone module without a wire cover but including a self-coiling wire harness.

Referring now specifically to the drawings, and the illustrative embodiments depicted therein, an accessory or microphone module 10 is mounted adjacent to a vehicle windshield 12, as shown in FIG. 1. Microphone module 10 may be implemented in the vehicle in association with an audio system, such as a cellular telephone, a recording device, such as a dictation system, an emergency communication device, such as the ONSTAR® system commercially available in certain General Motors vehicles, or any other audio device which may include a microphone or audio receiving device. Preferably, the manually actuated buttons to operate the ONSTAR® system are mounted at a movable housing 16*b* of an interior rear view mirror assembly 16, such as is shown generally at 13 in FIG. 1. The vehicle includes a headliner 14, which at least partially covers the ceiling of an interior passenger compartment of the vehicle and has a forward edge 14*a* which interfaces with an upper edge 12*a* of windshield 12. An interior rearview mirror assembly 16 may be mounted to an interior surface 12*b* of windshield 12, typically at a position spaced downwardly from upper edge 12*a* and the position of module 10. Microphone module 10 includes at least one microphone 18 which is fixedly secured within a microphone housing 20 and is directed toward an area generally defined by the location of a head of a typical driver of the vehicle. An indicator 72 is included for providing an audio signal receiving status message to a user of the audio system. The message conveys to the user whether the audio signal was adequately received by the microphone 18 and/or a receiving party of the audio system which is remote from the vehicle. The audio system of the vehicle, such as the ONSTAR® vehicle system, communicates with the receiving party, typically via a satellite transmission of radio frequencies or via a terrestrial radio frequency transmission system involving multiple receivers, transmitters, and/or repeaters. Microphone module 10 may further include a wire cover 22 which extends downwardly between housing 20 and mirror assembly 16 to encase or cover a mirror wire harness 24, which may be included in mirror assembly 16 to provide power or control signals to components or accessories which may be mounted within or associated with mirror assembly 16.

As shown in FIG. 2, mirror assembly 16 may include a conventional mounting button 16*a* and a mirror housing 16*b* supporting a prismatic, electro-optic or electrochromic reflective element 16*d*. Mounting button 16*a* may be adhesively secured to interior surface 12*b* of windshield 12 at a location substantially below forward edge 14*a* of headliner 14 and upper edge 12*a* of windshield 12, as is known in the art. Mirror housing 16*b* is pivotally mounted to mounting button 16*a* via an arm 16*c*, which is pivotally interconnected to button 16*a* or housing 16*b*, or both, such that housing 16*b* is pivotally adjustable about mounting arm 16*c*. Alternately, mounting arm 16*c* terminates at the vehicle headliner to pivotally mount the mirror assembly to the headliner of the vehicle. Mirror housing 16*b* encases a reflector 16*d* (FIG. 7) for reflecting an image of a scene generally rearwardly of the vehicle to the driver (and with the mirror housing being adjustable by the driver), and a bezel 16*e* which retains reflector 16*d* in housing 16*b*, as is well known in the art. Mirror wire harness 24 extends generally upwardly from mirror housing 16*b* to headliner 14 for electrical connection with a vehicle wiring harness 28 (FIG. 3). Mirror wire harness 24 provides electrical power and/or control signals to the mirror assembly 16 or various mirror mounted accessories within assembly 16, such as power for electro-optic/electrochromic mirrors, interior lights (such as map lights in the mirror housing), and displays such as for compass headings, temperatures, passenger airbag status, or the like.

Headliner 14 extends along upper edge 12*a* of windshield 12 and may be a plastic trim panel to secure a fabric ceiling cover and provide an aesthetically pleasing finish between the windshield and the fabric ceiling cover of the vehicle. Alternately, headliner 14 may be a forward portion of the fabric cover or a ceiling console. Headliner 14 may further include other trim or headliner console components (not shown), for storing various articles, such as sunglasses, garage door openers or the like or for housing other components or accessories associated with the vehicle.

Indicator 72 is operable with microphone 18 and the audio system to provide a signal to a user of the audio system, typically the driver of the vehicle, which conveys a level of reception of the user's vocal signal by the audio system. Indicator 72 may be used with microphone 18 as part of an interior rearview mirror system. The interior rearview mirror system may comprise a reflective element positioned in a mirror housing 16*b*. The housing 16*b* may be pivotally mounted to a mounting arm 16*c* which terminates at a mirror mount, such as at a mounting button or the like secured to the windshield and/or a mount at a header of the vehicle. The mirror system may include pods, gondolas, modules, or the like, attached to one or more of the housing, arm and mount. The mirror system may further include a wire cover and/or any microphone and/or accessory module. The mirror system may further include indicator 72, microphone 18 and/or other vehicle accessories mounted at, on or in the mirror assembly 16, such as at housing 16*b*, mounting arm 16*c*, mounting button 16*a*, or a pod or module attached thereto. Indicator 72 and microphone 18 and/or other accessories may otherwise be mounted at accessory module 10, without affecting the scope of the present invention.

Preferably, indicator 72 provides a receiving status signal in response to a reception of the audio signal by the audio system reaching a threshold level of clarity and/or volume. The signal may communicate the reception status of the microphone, so as to alert the driver to speak up or speak more clearly. Preferably, the indicator signal indicates when a human voice signal is being adequately received by the microphone. Alternately, or in addition to the reception status of the microphone, the indicator signal may communicate the reception status of a receiving party of the communication which is remote from the vehicle, such as another party's cellular phone or the ONSTAR® receiving station. For example, the indicator may be connected to a control (not shown) of the audio system and may receive a signal from the receiving party external to the vehicle, such as from the receiving station of the ONSTAR® system, which indicates whether the message sent by the user in the vehicle was adequately received by the ONSTAR® system.

Preferably, indicator 72 is operable with a control (not shown) which discriminates between vocal signals and other audible inputs received by microphone 18 which are non-vocal. The indicator 72 thus provides a signal that an adequately high voice signal to audible noise discrimination ratio is occurring. The indicator may indicate when an audible signal received by the audio system is above a threshold level. Preferably, the indicator indicates when the audible signal is a vocal signal which is discriminated from other audible noise, such as HVAC noise, wind noise, music and the like, so the vocal signal to non-vocal signal received by the audio system is at or above a predetermined threshold ratio. Preferably, this ratio is at least approximately 2:1. Most preferably, this ratio is at least approximately 10:1.

Preferably, indicator 72 provides a visual indication of the quality of the reception of the audio signals. Preferably, indicator 72 is a solid state light emitter such as a light emitting diode (LED), is a phosphorescent element or display or is a tell-tale, such as an LED backlit icon. However, indicator 72 may be an incandescent bulb, an incandescent backlit tell-tale, or any other illumination source, without affecting the scope of the present invention. The indicator may then display when the microphone and/or audio system is receiving and distinguishing or discriminating a good signal. For example, if the signal is adequately received, indicator 72 may be activated to provide an illumination signal to the driver, and if the signal is poor or is breaking up between the vehicle and the receiving end of the communication, the indicator may be deactivated or flashed to alert the user. Indicator 72 may also be operable as another signaling device when the audio system is not in use or is over ridden when it is desired to display the status of another vehicle function. For example, indicator 72 may provide a security system status indication (discussed below) or a status of other operable systems or controls within the vehicle. Preferably, indicator 72 would provide a status indication of a system or control which is not typically activated when the audio system would be in use, such as the security system, which is typically activated when a driver leaves the vehicle. Preferably, the intensity of indicator 72 is modulated dependent upon the vehicle cabin ambient light level. Thus, for example, the indicator intensity is decreased during night time driving conditions to better suit the then darkened cabin lighting environment. This can be achieved such as by use of a photo-detector (such as the ambient and/or glare photodetector commonly used in electrochromic (EC) automatic dimming interior rearview mirror assemblies) or may be tied to the vehicle lighting instrument panel system so that the intensity of indicator 72 dims in tandem with the dimming of, for example, the instrument panel displays.

Figure 9:
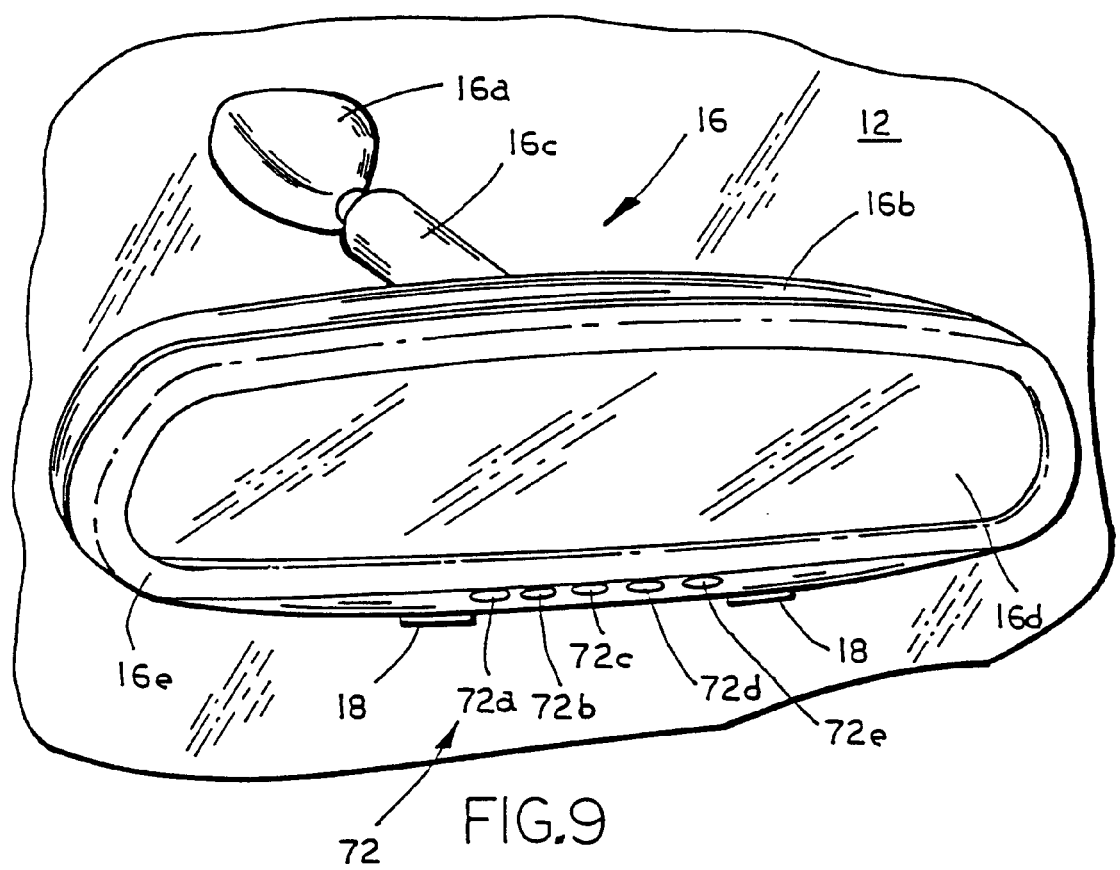
FIG. 9 is a perspective view of an interior rearview mirror incorporating the present invention.

It is further envisioned that the indicator 72 may include multiple light emitters 72*a*, 72*b*, 72*c*, 72*d*, and 72*e*, as shown in FIG. 9. The number of indicators illuminated would then provide an estimate to the user of the strength and/or quality of the audio signal being communicated. For example, if the signal is very strong or clear, all of the multiple light emitters may be illuminated, while if the signal is weak, some number of emitters less than all will be activated, depending on the strength or quality of the signal. Each emitter would be activated in response to a different threshold level of signal quality being received by the audio system.

Although indicator 72 is preferably one or more illumination sources, indicator 72 may alternately be an audible source, such as a loudspeaker or the like, which may provide an audio signal to the user of the audio system to alert the user when the signal quality drops below a threshold level of acceptability. The audible source may provide an audible tone when the signal quality deteriorates, or may include a voice chip, such as a digital recording of a human voice message contained on a semi-conductor chip, to tell the user of the system to speak up, repeat the message or speak more clearly. It is further envisioned that the indicator 72 may provide an alphanumeric display, which may provide a printed message or digital rating of signal quality to the user of the audio system. Each message displayed or number in a rating scale would correspond to a different threshold level of signal quality, such as clarity and/or volume.

Indicator 72 and microphone 18 may be connected to a control (not shown) which monitors the audio signals received by microphone 18. The control may be operable to discriminate between different audio signals, such as between voice signals and non-voice signals, such as music, fan noise, and wind noise. The control may be further operable to provide a message via indicator 72 to alert the user of the audio system to turn down a radio in the vehicle, turn down or off a blower for a heating, ventilation and air conditioning system, roll up the windows of the vehicle, and/or adjust other sources of non-voice signals within the vehicle, such as turn signals or the like, in response to a detection of one or more of these non-voice signals. Alternately, or in addition thereto, the control may further be operable to automatically adjust the volume of the radio, the fan speed of the blower, the window setting and the like in response to such a detection. The control and indicator may also alert the user of the system if multiple voices are being received simultaneously, such as via conversations between passengers in the vehicle or conversations on the radio, which may detract from the clarity of the signal being received by the microphone.

The audio system and microphone may further include a learning mode, whereby the audio system/microphone combination learns the vocal characteristics of a particular driver or occupant, so that the ratio of vocal signals to non-vocal noise signals received by the system can be enhanced. The learning mode may be operable in a memory system, such as is known in the automotive art, whereby a group of drivers and/or occupants, typically one, two or three individuals, may be recognizable by the audio system. The learning mode may be operable to recognize a particular individual's voice via the operator selecting the learning mode and speaking a brief message to the microphone. The audio system then receives the individual's voice message and repeats the message back to the individual via a speaker or alphanumeric display. This process is continued until the message is accurately recognized and repeated by the audio system. The recognized vocal characteristics may then be stored to memory for future use by the individual. A security feature for the audio system and/or any vehicle accessory and/or the vehicle itself can be provided via voice recognition.

Preferably, indicator 72 is mounted at, in or on the mirror housing 16b, either at, within or on or adjacent the bezel 16e. This is preferred because the driver of the vehicle is typically the person using the audio system, and this location provides optimal visibility of the indicator to the driver, since the mirror housing is adjusted to be directed toward the driver. Indicator 72 may otherwise be mounted in the housing 16b and behind the mirror reflector 16d, so as to illuminate through the reflector. However, as shown in the Figures, indicator 72 may alternately be positioned at accessory module 10, mirror mounting portion 16a, or headliner 14, and may be positioned at any other location where the indicator is visible to the user of the audio system, without affecting the scope of the present invention. It is further envisioned that indicator 72 may be implemented with a microphone 18 which is mounted at mirror housing 16b or mirror mounting portion 16a, as shown in FIGS. 2, 3, 7 and 9, in applications without an accessory module. As shown in FIG. 2, microphone 18 and indicator 72 may alternately be positioned at a pod 17, which may be attached to mounting portion 16a, arm 16c, or housing 16b of mirror assembly 16. A speaker 42 may also be included with microphone 18 and indicator 72, in applications either with or without accessory module.

By providing an indication of the receiving status of vocal signals received by the audio system, the present invention significantly reduces the possibility that a message will not be received clearly, correctly, and/or accurately by the receiving party. The vehicle based user of the audio system is alerted immediately if the microphone is not adequately receiving and/or is not adequately/correctly/accurately interpreting the message and/or if the other party to the communication is not adequately receiving the message. Accordingly, the user may speak up or speak more clearly, or adjust the volume of other noises or conversations within the vehicle to correct the reception concerns. The user may also re-send the message if it was not properly being received by the other party. The present invention is especially useful when the other party is an automatic or computer based voice recognition system. The user in the vehicle will be alerted by indicator 72 that the message sent may not have been properly received by the voice system and may then re-send the message or try again later in order to ensure that the message is properly received.

The audio system is connected to indicator 72 and microphone 18. Microphone 18 may share its audio receiving function with a plurality of audio systems, such as a cellular phone, the ONSTAR® system, a recording device, such as a digital recording device, and/or other systems which receive audio signals. Preferably, a digital recording device is incorporated in the interior rearview mirror system, such as within the interior rearview mirror housing. One or more functions may be selected at one time. For example, if the microphone is being used with a cellular phone function, it may also be used to provide an input to the recording device. The function of microphone may be manually selected by controls, such as switches or buttons, within the cabin of the vehicle or may be voice selected and controlled. Microphone 18 and the audio system may also be voice activated to further ease the operation of the audio system. This is preferred because it may be difficult to manually activate and control the audio system while driving the vehicle. Also, voice activation of the system substantially precludes the likelihood of leaving the system on when it is not in use, which would drain the vehicle's battery over time, since the audio system would be automatically deactivated when voices are not received by the microphone. Microphone 18 may also function as a receiver for one or more other vehicular functions and controls, such as voice activated headlamps, alarm systems, radios, cruise control, windows, cellular phones, message recorders, pagers, back up aids, windshield wipers, rain sensors and the like.

Optionally, the interior rearview mirror system can include a display of the status of the vehicle tire inflation (such status can be provided by monitoring the ABS braking system and/or by individual tire pressure sensors in the individual vehicle tires). The interior rearview mirror system may also include a PSIR (passenger side inflatable restraint) display for indicating the status of a PSIR. The tire inflation display, the PSIR display or other displays indicating the status of vehicular accessories or functions may be provided at the interior rearview mirror assembly, such as at, on or in the mirror housing, mounting arm, mounting button, or pod/module attached to the housing, arm or mounting button.

The interior rearview mirror system may further include a camera and/or display, for providing an image of an area not viewable by the rearview mirror when it is adjusted for driving conditions. Preferably, the camera may be directed toward the rear seats of the vehicle so as to function as a child minder. The portion of the vehicle being viewed by the camera (preferably a charge-coupled device (CCD) and, most preferably, a solid state Complementary metal-oxide-semiconductor (CMOS) camera) is preferably illuminated. Preferably, the video camera selected, such as a CMOS camera, is sensitive in the near-infrared region and so has night vision capability. Most preferably, the illumination is provided (preferably, mounted at and illuminating from the mounting site of the camera itself) by one or more near-infrared illumination sources, such as light emitting diodes which emit efficiently in the near-infrared portion (wavelengths from approximately 0.75 microns to about 1.5 microns), but which do not emit efficiently in the visible portion (wavelengths below approximately 0.75 microns) of the electromagnetic spectrum. Therefore, the interior cabin of the vehicle may be illuminated with radiation in a range which the camera is sensitive to, such that the system can form a clear image of the area on the display, while the cabin is not illuminated with visible light which, at night, may be sufficient to cause glare or discomfort to the driver and/or passengers in the illuminated area.

Although the mirror system and/or vehicle is described above as including one or more of a camera, pager system, cellular phone and the like, it is further envisioned that these accessories and others may be portable or dockable with a connecting port of the vehicle or mirror system. An individual or driver of the vehicle may use the personal pager, cellular phone, video camera, electronic personal organizers, such as a PILOT unit or the like, remote from the vehicle, such as at home, in a business office, or the like, and may then dock, plug in or otherwise connect the device to the connecting port for use within the vehicle. The devices may be dockable at the interior rearview mirror assembly, or may be dockable elsewhere in the vehicle, without affecting the scope of the present invention. The dockable device may, when docked into the vehicle, may personalize the controls and functions of the vehicle to suit that individual driver. Thus, features such as seat position, radio station selection, mirror field of view orientation, climate control, and other similar vehicle functions may be set to suit the individual preferences, or restrictions (such as a restriction from use of a cellular phone, or the like) for that particular driver. Such dockable portable devices may be especially useful to provide a security function and/or for tracking, logging, accounting for individual users, such as would be desirable for fleet operators, car rental operators, school bus fleet operators, and the like.

Microphone 18 may be mounted to accessory module 10, which includes wire cover 22 (FIGS. 1 and 2) which extends between a lower edge 20c of housing 20 and mounting button 16a of mirror 16. Mirror harness 24 is encased within wire cover 22 to retain harness 24 and provide a finished appearance to the electrical connection of mirror 16 to vehicle wiring harness 28. Preferably, wire cover 22 is telescopingly extendable and retractable to adapt the length to different mounting locations of mounting button 16a relative to headliner 14 on various vehicles. As best shown in FIG. 2, wire cover 22 may extend or retract by sliding upwardly or downwardly within housing 20. This facilitates implementation of microphone module 10 in various vehicles and further facilitates the aftermarket installation of module 10 in vehicles having a button-mounted interior rearview mirror.

Microphone module 10 is preferably secured to interior surface 12b of windshield 12 at an interface junction 26 between forward edge 14a of headliner 14 and interior surface 12a of windshield 12. However, it is envisioned that microphone module 10 may be mounted in other locations. Housing 20 of microphone module 10 is preferably formed with a substantially flat windshield mounting surface 20a and a curved, concave headliner surface 20b, such that housing 20 mounts to windshield 12 along mounting surface 20a, while headliner surface 20b substantially uniformly engages headliner 14 to provide a flush, finished transition between microphone module 10 and headliner 14. Preferably, housing 20 is adhesively secured to interior surface 12b of windshield 12, such as by bonding, pressuring sensitive adhesives, anaerobic adhesives, double faced tape, or the like. However, microphone module 10 may optionally be mechanically secured to an intermediate mounting bracket adhered to the windshield, or may be connected to the headliner itself, as discussed below, without affecting the scope of the present invention. Microphone module 10 is preferably a plastic molded part, which facilitates forming the part in various shapes to match the headliner/windshield interface and to further facilitate providing the part in different colors to match optional interior colors of the vehicles.

Figure 7:
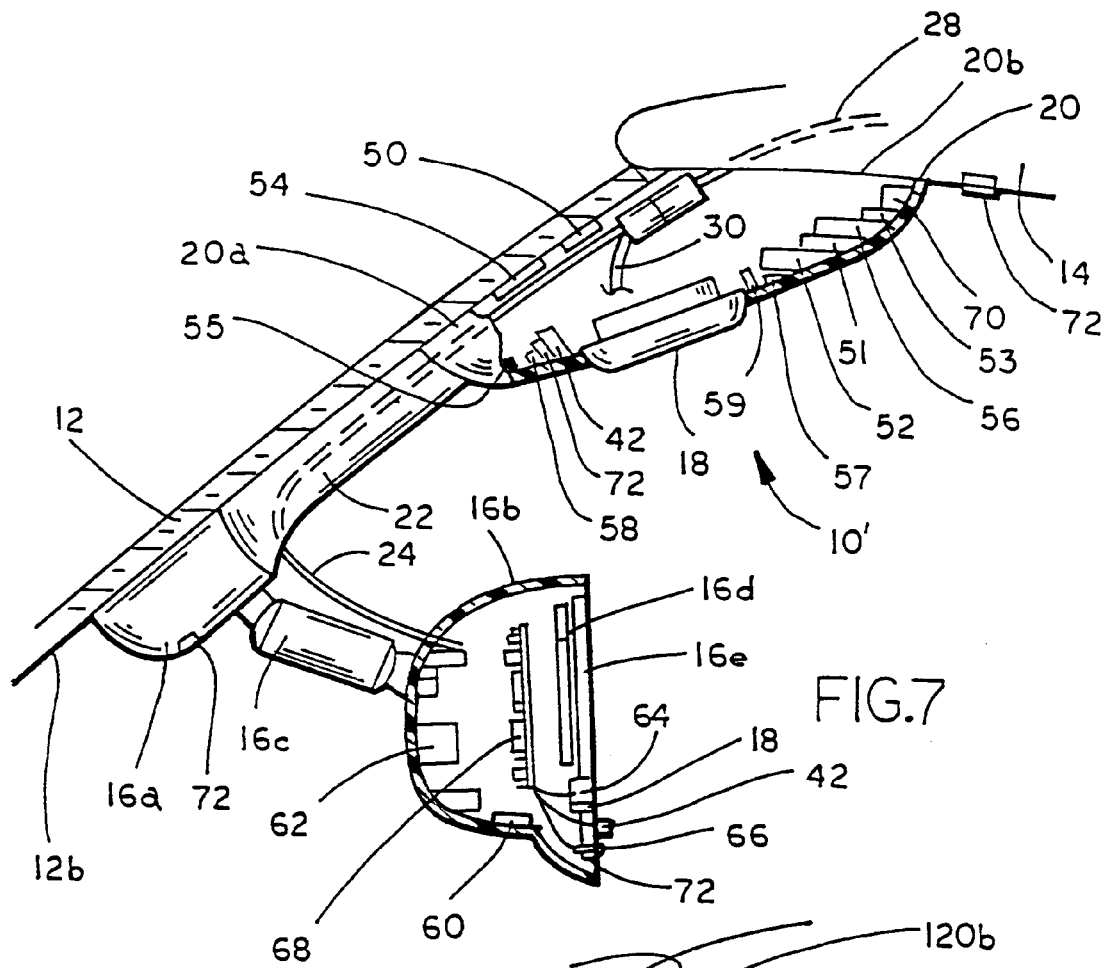
FIG. 7 is a side elevation shown partially in section of a microphone module and mirror housing having various electrical and/or electronic components therein.

Mirror harness 24 may connect directly to vehicle wiring 28 while an accessory wiring harness 30 may separately connect to the vehicle wiring to provide power and/or control signals to the accessories within accessory module 10. Alternately, mirror harness 24 may connect to module 10, which may then be connectable to vehicle wiring 28, as shown in FIGS. 3 and 7. Because microphone module 10 may be a separate module from the headliner and the mirror assembly, and because module 10 is preferably connected to the vehicle wiring independent of wires from the interior rear view mirror assembly to the vehicle wiring, microphone module 10 may be easily removed or accessed for serviceability or replacement without having to remove or replace the mirror assembly. This is a significant advantage over the prior art because if the microphone is damaged, the more expensive components, such as the mirror or headliner console, do not have to be replaced in order to repair or replace the microphone.

Microphone module 10 may be mounted to windshield 12 such that microphone 18 is directed downwardly and rearwardly toward the driver's seat of the vehicle to optimally receive audio signals therefrom. Preferably, microphone 18 is a directional or polar microphone, which limits the audio signal received to signals within the area toward which the microphone is directed. Such microphones are known in the art and are commercially available as an AKG 400 Series or a 501T Series microphone from A.K.G. Acoustics/GMBH in Vienna, Austria. These microphones are operable to receive audio signals from within the targeted area, while substantially reducing or limiting the signals received from outside that area. By mounting microphone 18 within housing 20 and directing microphone 18 downward and rearward toward a typical location of a driver's head, the audio signal detected by microphone 18 will be dominated by a voice signal from the driver of the vehicle and will substantially limit noise signals originating from other sources, such as the engine, road, wind, HVAC, radio, turn signals and the like. Because microphone 18 may be fixedly mounted within housing 20, microphone 18 may be optimally directed toward the area of interest, and will not be adjusted or misdirected when the mirror is adjusted for a different driver of the vehicle.

Alternately, multiple microphones may be implemented within microphone module 10 to receive various signals from different directions. As is known in the audio art, RMF techniques may be implemented to digitize individual outputs from the multiple microphones and integrate the outputs to establish which outputs are the loudest and which have the presence of human audible signals verses noise. The signals which have the greatest presence of human audible signals may then be selected over the signals of the other microphones, thereby providing a voice signal to the communication device.

Microphone module 10 further includes a microphone wire harness 30 (FIG. 3), which extends from microphone 18 through headliner surface 20b of housing 20 and into headliner 14. Microphone 18 is preferably interconnectable to the vehicle harness by microphone harness 30 in a conventional manner. Preferably, microphone harness 30 comprises a pair of wires for microphone 18. Clearly, however, if multiple microphones are implemented in microphone module 10, multiple wires (not shown) will correspondingly be required. Furthermore, if indicator 72 is included in module 10, additional wiring 30a (FIG. 4) will also be required.

As shown in FIG. 2, the audio system may further include a loud speaker 42 for providing an audible signal to the driver and passengers of the vehicle. Speaker 42 may be mounted to housing 20 and includes a wiring harness 43 for electrical connection to the vehicle wiring 28, similar to microphone 18. Speaker 42 may be a conventional diaphragm speaker, piezo-electric speaker, such as a piezo-electric ceramic speaker, or the like. Most preferably, speaker 42 is a piezo-electric ceramic moldable speaker. Additional speakers may be mounted within the accessory module 10 or in a pod 17 attached to the mirror mounting bracket 16a of the interior rear view mirror assembly.

It is further envisioned that the audio system may include multiple microphones and/or speakers positioned at different locations within the vehicle to supplement one another in order to optimally receive and project the audio signals from and to the desired areas within the vehicle. For example, as shown in FIG. 2, one or more microphones 18 and/or speakers 42 may be positioned in module 10, as well as in mirror housing 16b, in mounting button 16a, and/or within a pod 17, which may be mounted to mirror assembly 16 and extends downwardly beneath mirror housing 16b. Clearly, pod 17 may alternately be positioned above or to either side of mirror housing 16b, without affecting the scope of the present invention. The microphone 18 and speaker 42 may access and/or share the electronic circuitry of an electro-optic or electrochromic mirror. By providing one or more microphones and speakers within the vehicle, the overall effectiveness of the audio system may be improved, since signals not optimally directed toward the microphone within the module, may be better received by the microphone in the pod, mirror housing, or button. It is further envisioned that one or more indicators 72 may be positioned at one or more locations within the vehicle, such as at the module 10, mirror housing 16b, mounting button 16a, and/or pod 17, as shown in FIG. 2. Microphone 18 and/or speaker 42 may also be positioned at the mirror or pod assemblies in conjunction with microphones or speakers in a module 10 or in applications where the vehicle does not include a microphone module.

Although shown as having a microphone 18 within a module 10, the present invention includes implementation of a microphone 18 and indicator 72 in various locations within the cabin of the vehicle. As shown in FIG. 9, microphone 18 and indicator 72 may be mounted to mirror housing 16b. Alternately, microphone 18 and/or indicator 72 may be mounted to the mirror mounting button 16a or at a pod or other mounting device positioned in the vicinity of the mirror assembly 16. If the audio system includes a speaker and/or a recording device, the speaker and/or recording device may be mounted to the mirror assembly or pod, or may be positioned elsewhere within the cabin of the vehicle, either in the vicinity of the microphone and/or the indicator or remote therefrom.

Referring again to FIG. 3, microphone module 10 may alternately connect to the vehicle wiring harness 28 via electrical connectors 32 and 33. For example, a socket 33 may be provided in housing 20 of microphone module 10, such that vehicle wiring harness 28 may include a corresponding male connector, such as a conventional twelve pin connector, which mates with socket 33. Microphone harness 30 may then extend from socket 33 to microphone 18, while remaining within housing 20. Similarly, mirror harness 24 may extend from socket 33 downwardly through housing 20 and wire cover 22 to mirror assembly 16. By connecting both the mirror harness 24 and microphone harness 30 to the vehicle harness 28 with connectors 32 and 33, microphone module 10 further facilitates simplified installation of mirror assembly 16 within the vehicle.

As shown in FIGS. 3 and 4, microphone module 10 may be mechanically secured to window 12 and/or headliner 14. For example, a bracket 34 may be bonded or otherwise adhesively secured to interior surface 12d of windshield 12. Window surface 20a of housing 20 may then be correspondingly formed with bracket 34 to engage the bracket for removable mounting of microphone module 10 to windshield 12. As best shown in FIG. 4, bracket 34 may include a windshield mounting surface 34a and a pair of mounting flanges 34b which are offset from the position of mounting surface 34a and extend laterally outwardly from a pair of sidewalls 34c, which extend downwardly and rearwardly from mounting portion 34a. Windshield surface 20a of housing 20 may then be correspondingly formed to slidably engage mounting flanges 34b of bracket 34, such that housing 20 is slidable upwardly along bracket 34 until headliner surface 20b interfaces with headliner 14. At that point, one or more mounting pins or fasteners 36 may be inserted through housing 20 and mounting flanges 34b to substantially secure the components together. Alternatively, or in addition to fasteners 36, a headliner fastener 38 (FIG. 3) may extend through headliner surface 20b of housing 20 and engage a bracket 40 within headliner 14, thereby substantially securing housing 20 to both windshield 12 and headliner 14. Mounting fasteners 36 and 38 may be threaded fasteners or push-pin or snap fit type fasteners, to substantially secure housing 20 to the respective brackets 34 and 40. It is further envisioned that the mounting bracket and microphone housing may be correspondingly formed to press-fit together or snap or otherwise lock together as the microphone housing is moved to the appropriate mounting location relative to the bracket. Clearly, other mounting brackets and/or fasteners may be implemented to substantially secure microphone module 10 relative to windshield 12 or headliner 14, without affecting the scope of the present invention.

Referring now to FIG. 5, microphone module 10 may be implemented without a wire cover. The mirror wiring harness may extend freely downwardly from microphone housing 20 to mirror housing 16b or may be adhered or otherwise secured or guided along interior surface 12b of windshield 12 and further along arm 16c to mirror housing 16b. Alternately, as shown in FIG. 5, a mirror harness 24' may be implemented to provide an aesthetically pleasing spirally-coiled cord, similar to a conventional telephone cord, which extends downwardly from lower end 20c of housing 20 and curves rearwardly toward housing 16b of mirror assembly 16. Mirror harness 24' may be electronically connectable with vehicle wiring harness 28 via conventional electrical connectors 32' and 33', while microphone harness 30 is electronically connected with the vehicle wiring harness separately, as discussed above with reference to FIG. 2. Clearly, however, mirror harness 24' and microphone harness 30 may be connectable to vehicle wiring harness 28 by any other conventional means, without affecting the scope of the present invention. As discussed above with reference to FIGS. 2 and 3, housing 20 may be bonded to, adhesively secured or mechanically fastened to interior surface 12b of windshield 12 and/or to headliner 14.

Although specific embodiments of the microphone module of the present invention are shown in FIGS. 2 through 5 and discussed above, clearly the scope of the present invention includes other means of mounting the microphone module and of covering or guiding the mirror harness between the microphone module and the mirror. For example, the microphone module may be mounted to the windshield between mounting button 16a and headliner 14 and have wire covers or the like extending from both upper and lower ends of the module to cover wires between the headliner and the module and further between the module and the mirror assembly. Alternatively, the microphone module may be mounted above and adjacent to the mirror mounting button 16a and include a wire cover which extends upwardly therefrom to substantially encase the wires extending from the module to the headliner for connection with the vehicle wiring harness. It is further envisioned that the microphone module may be part of a plastic wire cover extending upwardly from the interior rear view mirror assembly toward the headliner. The wiring harnesses associated with the mirror assembly, the microphone and the indicator may be routed and connected with the vehicle wiring harness by any known means without effecting the scope of the present invention. The microphone, indicator and mirror assembly may be implemented as a single component, which requires fewer assembly plant installation processes, thereby reducing the costs associated with the vehicle manufacture. It is further envisioned that microphone 18 and indicator 72 may be mounted anywhere within the cabin of the vehicle without an accessory module. Preferably, both are positioned forwardly of the driver of the vehicle to optimally receive a voice signal from the driver and to be easily viewed by the driver while looking forwardly. Preferably, the microphone and indicator are mounted at the rearview mirror housing 16b, the mirror button 16a, the headliner 14, and/or a pod attached to the mirror assembly (such as a pod attached to the mirror button mount of the interior rearview mirror assembly), windshield or headliner.

Figure 8:
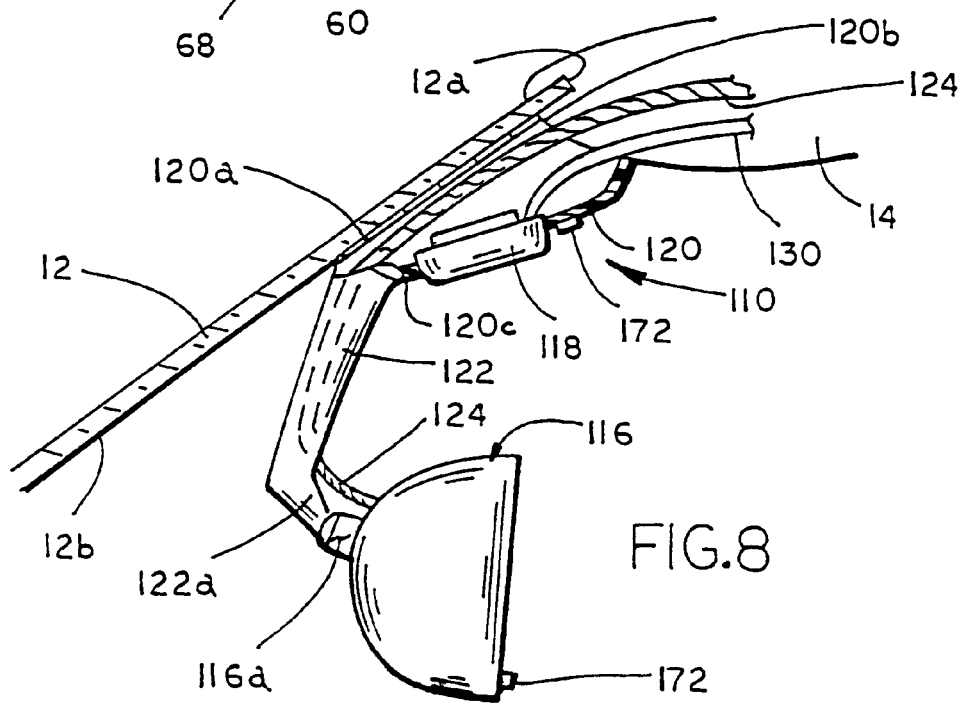
FIG. 8 is a similar side elevation as that in FIG. 2 of an alternate embodiment of the present invention, having a rearview mirror mounted to an arm extending downwardly from the microphone module.

Although shown and described above as being implemented with a button mounted interior rearview mirror assembly, an alternate embodiment of the present invention may incorporate a mirror assembly 116 with a microphone module 110, as shown in FIG. 8. Microphone module 110 preferably includes a microphone 118 and a microphone housing 120, which are substantially similar to microphone 18 and housing 20, discussed above with respect to microphone module 10. However, microphone module 110 further includes a mirror mounting arm 122, which extends generally downwardly from a lower portion 120c of housing 120. Mirror assembly 116 is pivotally mounted to a lower end 122a of arm 122 via a conventional ball and socket connection 116a. A mirror wiring harness 124 extends from mirror assembly 116 upwardly through arm 122 and further through housing 120 and into header 14 of the vehicle for electrical connection with the vehicle wiring harness. A microphone harness 130 may also electronically connect microphone 118 with the vehicle wiring harness, as discussed above with respect to microphone harness 30. Microphone module 110 and mirror assembly 116 may be electronically connected to the vehicle wiring harness by any known means, without affecting the scope of the present invention. An indicator 172 may be included at module 110 and/or at mirror housing 116 to provide an audio signal receiving status to the driver of the vehicle or user of the audio system, similar to indicator 72, discussed above. Similar to microphone module 10, a windshield surface 120a of housing 120 may be adhesively or mechanically secured along an interior surface 12b of windshield 12.

Figure 6:
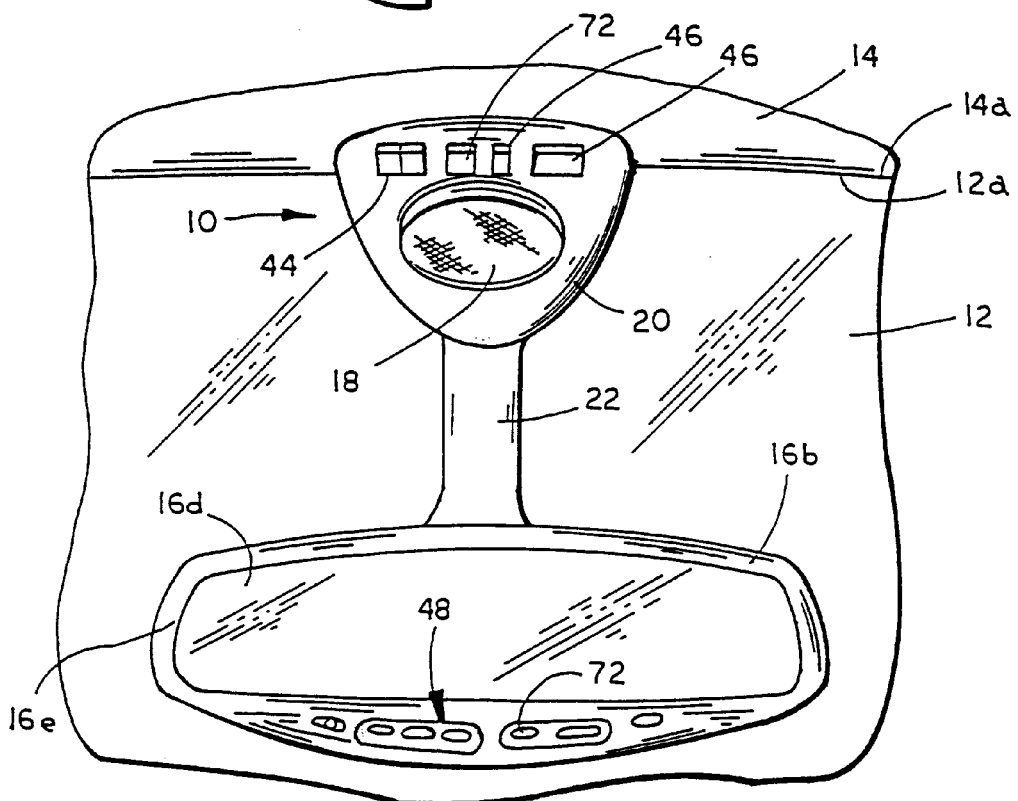
FIG. 6 is an elevation looking forwardly in a vehicle cabin of a microphone module and mirror housing having controls mounted thereon.

As shown in FIG. 6, microphone module 10 may further include manual controls for the audio or communication device associated with microphone 18, such as buttons 44 for activating and/or adjusting the communication device. Microphone module 10 may further include other manual controls 46 for activating or adjusting other accessories or devices within the vehicle, such as interior or exterior lights, or for selecting a function for microphone 18, such as a cellular phone versus an emergency communication device or recording device. Mirror housing 16b may also include controls, buttons or switches, shown generally at 48, for selectively activating, deactivating or adjusting one or more accessories associated with the vehicle. For example, controls 48 may activate map reading lights on mirror housing 16b, temperature displays, compass heading displays or the like, which may be displayed on a portion of mirror housing 16b and are thus easily visible to the driver of the vehicle. Alternatively, however, controls 46 and 48 on microphone module 10 and mirror housing 16b, respectively, may control accessories or lights which are located on or within the vehicle and yet are remote from microphone module 10 and mirror 16.

Referring now to FIG. 7, an accessory module 10' may further include multiple accessories, components or devices associated with various control systems of the vehicle and connected with a vehicle control or the vehicle wiring harness. For example, accessory module 10' may include a microphone 18, an indicator 72, a loudspeaker 42, a Global Positioning System (GPS) antenna 50, a motion sensor 52, a rain sensor 54, a video device or camera 56, an interior light 58, an automatic toll booth transducer 59, a security system status indicator 70, a compass and/or compass sensor 51, a temperature display and/or temperature sensor 53, a tire pressure indicator display 55, a seat occupancy detection antenna and/or transducer 57, and/or any other devices, components or circuitry which may be useful to mount in accessory module 10'. Preferably, camera 56 is a pixelated imaging array sensor, such as a CMOS imaging array or the like, a description of which is disclosed in commonly assigned U.S. Pat. No. 5,670,935, issued to Schofield et al., the disclosure of which is hereby incorporated herein by reference. The module 10' may provide a location for these devices which is highly visible and eases user interface by the driver or passengers of the vehicle. Furthermore, mirror housing 16b may also include electrical devices and electronic components, such as other microphones 18, indicators 72 and loudspeakers 42, map reading lights 60, compass 62, display 64, trip computer 66, or other components or devices associated with the vehicle. Mirror harness 24 may provide power and/or control signals to these components or devices and may interconnect with the control circuitry of the devices and of an electrochromic mirror function control circuitry 68 for electronically adjusting the reflectivity of reflector 16d within mirror housing 16b. Display 64 may display vehicle status or information displays, such as compass headings, interior or exterior temperatures, clock display, fuel level display, air bag status display, telephone dial information display, or other status displays of various components or devices associated with the vehicle. Information displayed in display 64 may be selectively displayed by an operator via controls 48 (FIG. 6), or may be cyclically displayed or may be displayed when there is a change in status of one of the devices.

It is envisioned that accessory module 10' may further include multiple electrical and/or electronic components, such as those described in commonly assigned, co-pending U.S. patent application Ser. No. 08/918,772, filed Aug. 25, 1997 by Deline et al., now U.S. Pat. No. 6,124,886, and Ser. No. 09/244,726, filed Feb. 5, 1999 by Deline et al., now U.S. Pat. No. 6,172,613, the disclosures of which are hereby incorporated herein by reference. The mirror and/or the microphone module may communicate with these or other devices or components within the vehicle as part of a Car Area Network (CAN) or multiplex system, such as is disclosed in commonly assigned U.S. Pat. No. 5,798,575, issued to O'Farrell et al., PCT International Application published Sep. 25, 1997 under International Publication No. WO 97/34780, and PCT International Application No. PCT/IE98/00001, filed Jan. 9, 1998 and published Jul. 16, 1998 under International Publication Number WO 98/30415, the disclosures of which are hereby incorporated herein by reference, a Local Interconnect Network (LIN), or similar communications protocols, which may support the control of mechatronic nodes in automotive distributor applications.

Accessory module 10' may also include an illumination source 70 for a vehicle security system, such as an intrusion detection system, vehicle alarm system, vehicle antitheft system, or the like. The illumination source may be an incandescent source or a nonincandescent source. Preferably, illumination source 70 is a nonincandescent, solid state source such as a light emitting diode (LED), an electroluminescent device or the like. The illumination source 70 is operable to blink or flash intermittently when the system is armed. Typically, such systems flash the illumination source rapidly at first for up to approximately 30 seconds (or longer) after arming of the system, and then intermittently flash the illumination source for a continuous period while the system is activated (for example, once every one to two seconds), thereby alerting people within the vehicle that the security system is activated. Optionally, the security system indicator may be provided by indicator 72. Indicator 72 may provide an audio signal receiving status when the audio system is in use, and then provide a security system status signal when the audio system is deactivated and/or the security system is armed.

It is further envisioned that the illumination source for the vehicle security system may be included in a separate module or pod which may be mounted to the microphone or accessory module the mirror assembly, or the vehicle headliner. The illumination source module may be substantially similar to the microphone or accessory module discussed above and may clip or otherwise be mounted to the microphone module. For example, the illumination source module may snap into a mounting aperture in the microphone module or may be adhesively mounted to a side wall of the microphone housing. Alternately, the security system activation status source module may be mounted to the mirror assembly, such as to the mounting button, arm or mirror housing. The illumination source module may then be positioned below, above, or to either side of the mirror housing to facilitate viewing of the illumination source by passengers within the vehicle. The illumination source module may otherwise be mounted to the wire cover of the microphone module such that it is visible above the mirror housing. If the vehicle includes a header mounted mirror assembly, it is further envisioned that the illumination source module may be mounted to, or included as part of, the header mirror mounting bracketry or other mounting device.

By providing a vehicle security system illumination source module as a separate component, greater flexibility is achieved by the vehicle manufacturers. The separate security system module avoids the additional expenses required to tool two different mirror cases for vehicles with or without a security system. The optional pod or module with the illumination source may be simply installed as a vehicle option, or as an aftermarket device. Similar to the microphone and accessory modules discussed above, the illumination source module for the security system may further include other components, devices, controls or displays associated with the security system or other systems within the vehicle. It is further envisioned that other pods or modules which include one or more various components or devices associated with other systems or devices of the vehicle may be implemented to facilitate easy installation of the components of the systems either in the assembly plant or as aftermarket devices.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. An accessory system for a vehicle, said accessory system comprising:
    a bracket comprising a windshield-facing side and a cabin-facing side;
    the windshield-facing side of said bracket bonded by an adhesive at a first windshield location to an in-cabin surface of a windshield of a vehicle equipped with said accessory system;
    the cabin-facing side of said bracket comprising first structure;
    an accessory module comprising a housing;
    wherein said accessory module is configured to mount to said bracket;
    wherein an electronic device and circuitry are housed by said housing;
    said housing of said accessory module comprising second structure;
    wherein said electronic device comprises a CMOS camera and wherein said camera comprises an imaging array;
    wherein said housing is configured to mount to said bracket when said bracket is attached to the vehicle windshield;
    wherein said second structure of said housing directly engages said first structure of said bracket when mounting said housing to said bracket;
    wherein, with said accessory module mounted to said bracket attached to the vehicle windshield, said circuitry is in communication with a vehicle bus system of the equipped vehicle;
    wherein an interior rearview mirror assembly is attached at a second windshield location at the vehicle windshield, and wherein said second windshield location is spaced from said first windshield location where said bracket is attached to the vehicle windshield;
    wherein, when mounted to said bracket attached to the vehicle windshield, said accessory module is removable from said bracket for service or replacement without detaching said interior rearview mirror assembly from the windshield;
    wherein said second structure of said housing comprises a first housing element of said housing and a second housing element of said housing;
    wherein said first and second housing elements are spaced apart;
    wherein said first structure of said bracket comprises a first bracket element and a second bracket element;
    wherein said first bracket element is similarly spaced apart from said second bracket element;
    wherein said first bracket element engages said first housing element when mounting said housing to said bracket;
    wherein said second bracket element engages said second housing element when mounting said housing to said bracket; and
    wherein said first and second housing elements are at opposite parts of said housing.

2. The accessory system of claim 1, wherein said housing and said bracket snap-fit together.

3. The accessory system of claim 1, wherein, with said housing mounted to said bracket attached to the vehicle windshield, a gap is provided at where the housing of said accessory module coincides with and covers the cabin-facing side of said bracket.

4. The accessory system of claim 1, wherein said vehicle bus system comprises a vehicle CAN bus system.

5. The accessory system of claim 1, wherein said vehicle bus system comprises a vehicle LIN bus system.

6. The accessory system of claim 1, wherein said bracket comprises two side walls that extend outward away from the vehicle windshield when said bracket is attached to the vehicle windshield.

7. The accessory system of claim 1, wherein, with said bracket attached to the vehicle windshield, at least a portion of said bracket is disposed at a region of the vehicle windshield that is between said second windshield location where the interior rearview mirror assembly is attached at the vehicle windshield and a headliner portion at the ceiling region of the interior cabin of the equipped vehicle.

8. The accessory system of claim 1, wherein said housing houses a microphone and wherein said microphone is part of a voice acquisition system of the equipped vehicle.

9. The accessory system of claim 1, wherein said circuitry housed by said housing connects to a wire harness of the equipped vehicle.

10. The accessory system of claim 1, wherein said first and second housing elements are at opposite parts of said housing.

11. The accessory system of claim 1, wherein said first and second housing elements comprise grooves at opposite parts of said housing.

12. The accessory system of claim 1, wherein said first bracket element slidably engages said first housing element when mounting said housing to said bracket, and wherein said second bracket element slidably engages said second housing element when mounting said housing to said bracket.

13. The accessory system of claim 1, wherein said accessory module includes at least two microphones and wherein said microphones are part of a voice acquisition system of the equipped vehicle, and wherein said voice acquisition system comprises an indicator operable to indicate when vocal inputs received at said microphones are being adequately distinguished from noise by a control of said voice acquisition system, and wherein said microphones provide sound capture for at least one of a hands-free cell phone system, an audio recording system and a wireless communication system, and wherein said accessory module includes an illumination source for a vehicle security system, and wherein said illumination source comprises a light emitting diode, and wherein a control of said voice acquisition system at least partially distinguishes vocal signals from non-vocal signals, and wherein said control of said voice acquisition system is operable to distinguish vocal signals from non-vocal signals by a ratio of at least 10:1.

14. The accessory system of claim 1, wherein said accessory module comprises an electrical connector configured for connection to a vehicle wiring harness of the equipped vehicle.

15. The accessory system of claim 14, wherein said electrical connector comprises a socket, and wherein said vehicle wiring harness comprises a corresponding male connector that mates with said socket.

16. The accessory system of claim 15, wherein said male connector comprises multiple pins.

17. The accessory system of claim 16, wherein said male connector comprises up to 12 pins.

18. The accessory system of claim 1, wherein, with said accessory module mounted to said bracket attached to the vehicle windshield, said camera views into the interior cabin of the equipped vehicle.

19. The accessory system of claim 18, wherein said housing is configured to snap attach to said bracket when said bracket is attached to the vehicle windshield.

20. The accessory system of claim 18, wherein said housing is configured to press fit to said bracket when said bracket is attached to the vehicle windshield.

21. An accessory system for a vehicle, said accessory system comprising:
- a bracket comprising a windshield-facing side and a cabin-facing side;
- the windshield-facing side of said bracket bonded by an adhesive at a first windshield location to an in-cabin surface of a windshield of a vehicle equipped with said accessory system;
- the cabin-facing side of said bracket comprising first structure;
- an accessory module comprising a housing;
- wherein said accessory module is configured to mount to said bracket;
- wherein, when mounted to said bracket attached to the vehicle windshield, said accessory module is removable from said bracket for service or replacement;
- wherein an electronic device and circuitry are housed by said housing;
- said housing of said accessory module comprising second structure;
- wherein said electronic device comprises a CMOS camera and wherein said camera comprises an imaging array;
- wherein said housing is configured to mount to said bracket when said bracket is attached to the vehicle windshield;
- wherein said second structure of said housing directly engages said first structure of said bracket when mounting said housing to said bracket;
- wherein, with said accessory module mounted to said bracket attached to the vehicle windshield, said circuitry is in communication with a vehicle CAN bus system of the equipped vehicle;
- wherein said second structure of said housing comprises a first housing element of said housing and a second housing element of said housing;
- wherein said first and second housing elements are spaced apart;
- wherein said first structure of said bracket comprises a first bracket element and a second bracket element;
- wherein said first bracket element is similarly spaced apart from said second bracket element;
- wherein said first bracket element slidably engages said first housing element when mounting said housing to said bracket;
- wherein said second bracket element slidably engages said second housing element when mounting said housing to said bracket;
- wherein said first and second housing elements are at opposite parts of said housing; and
- wherein said first and second housing elements comprise grooves at opposite parts of said housing.

22. The accessory system of claim 21, wherein said accessory module comprises an electrical connector configured for connection to a vehicle wiring harness of the equipped vehicle, and wherein said electrical connector comprises a socket, and wherein said vehicle wiring harness comprises a corresponding male connector that mates with said socket, and wherein said male connector comprises multiple pins.

23. The accessory system of claim 22, wherein an interior rearview mirror assembly is attached at a second windshield location at the vehicle windshield, and wherein said second windshield location is spaced from said first windshield location where said bracket is attached to the vehicle windshield, and wherein, when mounted to said bracket attached to the vehicle windshield, said accessory module is removable from said bracket for service or replacement without detaching said interior rearview mirror assembly from the windshield.

24. The accessory system of claim 23, wherein said housing is configured to snap attach to said bracket when said bracket is attached to the vehicle windshield.

25. The accessory system of claim 23, wherein said housing is configured to press fit to said bracket when said bracket is attached to the vehicle windshield.

26. An accessory system for a vehicle, said accessory system comprising:
- a bracket comprising a windshield-facing side and a cabin-facing side;
- the windshield-facing side of said bracket bonded by an adhesive at a first windshield location to an in-cabin surface of a windshield of a vehicle equipped with said accessory system;
- the cabin-facing side of said bracket comprising first structure;
- an accessory module comprising a housing;
- wherein said accessory module is configured to mount to said bracket;
- wherein, when mounted to said bracket attached to the vehicle windshield, said accessory module is removable from said bracket for service or replacement;
- wherein an electronic device and circuitry are housed by said housing;
- said housing of said accessory module comprising second structure;
- wherein said electronic device comprises a camera and wherein said camera comprises an imaging array;
- wherein said second structure of said housing directly engages said first structure of said bracket when mounting said housing to said bracket;
- wherein said second structure of said housing comprises a first housing element of said housing and a second housing element of said housing;
- wherein said first and second housing elements are spaced apart;
- wherein said first structure of said bracket comprises a first bracket element and a second bracket element;
- wherein said first bracket element is similarly spaced apart from said second bracket element;
- wherein said first bracket element engages said first housing element when mounting said housing to said bracket;
- wherein said second bracket element engages said second housing element when mounting said housing to said bracket; and
- wherein said accessory module comprises an electrical connector configured for connection to a vehicle wiring harness of the equipped vehicle, and wherein said electrical connector comprises a socket, and wherein said vehicle wiring harness comprises a corresponding male connector that mates with said socket, and wherein said male connector comprises multiple pins.

27. The accessory system of claim 26, wherein said first bracket element slidably engages said first housing element when mounting said housing to said bracket, and wherein said second bracket element slidably engages said second housing element when mounting said housing to said bracket, and wherein said first and second housing elements are at opposite parts of said housing.

28. The accessory system of claim 27, wherein, with said accessory module mounted to said bracket attached to the vehicle windshield, said circuitry is in communication with a vehicle bus system of the equipped vehicle.

29. The accessory system of claim 28, wherein, with said housing mounted to said bracket attached to the vehicle windshield, a gap is provided at where the housing of said accessory module coincides with and covers the cabin-facing side of said bracket, and wherein an interior rearview mirror assembly is attached at a second windshield location at the vehicle windshield, and wherein said second windshield location is spaced from said first windshield location where said bracket is attached to the vehicle windshield.

30. The accessory system of claim 27, wherein said first and second housing elements comprise grooves at opposite parts of said housing.

31. The accessory system of claim 30, wherein an interior rearview mirror assembly is attached at a second windshield location at the vehicle windshield, and wherein said second windshield location is spaced from said first windshield location where said bracket is attached to the vehicle windshield, and wherein, when mounted to said bracket attached to the vehicle windshield, said accessory module is removable from said bracket for service or replacement without detaching said interior rearview mirror assembly from the windshield.

32. The accessory system of claim 31, wherein, with said bracket attached to the vehicle windshield, at least a portion of said bracket is disposed at a region of the vehicle windshield that is between said second windshield location where the interior rearview mirror assembly is attached at the vehicle windshield and a headliner portion at the ceiling region of the interior cabin of the equipped vehicle.

33. The accessory system of claim 26, wherein said bracket comprises two side walls that extend outward away from the vehicle windshield when said bracket is attached to the vehicle windshield.

34. The accessory system of claim 26, wherein said housing is configured to snap attach to said bracket when said bracket is attached to the vehicle windshield.

35. The accessory system of claim 26, wherein said housing is configured to press fit to said bracket when said bracket is attached to the vehicle windshield.

* * * * *